US012810632B2

(12) United States Patent
Wang et al.

(10) Patent No.: US 12,810,632 B2
(45) Date of Patent: Nov. 24, 2026

(54) METHODS AND SYSTEMS FOR THREE-DIMENSIONAL CHARACTER RECOGNITION

(71) Applicant: WLZ SMART QUALITY UNIT, Suzhou (CN)

(72) Inventors: Sen Wang, Suzhou (CN); Chidong Zhou, Suzhou (CN); Jie Xu, Suzhou (CN)

(73) Assignee: WLZ SMART QUALITY UNIT, Suzhou (CN)

( * ) Notice: Subject to any disclaimer, the term of this patent is extended or adjusted under 35 U.S.C. 154(b) by 253 days.

(21) Appl. No.: 18/674,916

(22) Filed: May 27, 2024

(65) Prior Publication Data

US 2024/0371182 A1 Nov. 7, 2024

Related U.S. Application Data

(63) Continuation of application No. PCT/CN2021/135039, filed on Dec. 2, 2021.

(51) Int. Cl.
*G06V 20/64* (2022.01)
*G06T 7/50* (2017.01)
(Continued)

(52) U.S. Cl.
CPC .............. *G06V 20/653* (2022.01); *G06T 7/50* (2017.01); *G06V 20/647* (2022.01);
(Continued)

(58) Field of Classification Search
CPC ............. G06T 7/50; G06T 2207/10028; G06T 2207/30164; G06V 20/647; G06V 20/653;
(Continued)

(56) References Cited

U.S. PATENT DOCUMENTS 10,438,036 B1 * 10/2019 Reome ................. G06K 7/1404
11,274,921 B1 * 3/2022 Walz ...................... G01B 11/24
(Continued)

FOREIGN PATENT DOCUMENTS

CN 102426649 A 4/2012
CN 103065146 A 4/2013
(Continued)

OTHER PUBLICATIONS

International Search Report in PCT/CN2021/135039 mailed on Aug. 30, 2022, 7 pages.
(Continued)

*Primary Examiner* — Katrina R Fujita
(74) *Attorney, Agent, or Firm* — METIS IP LLC

(57) ABSTRACT

One or more embodiments of the present disclosure provide a method for recognizing a three-dimensional (3D) character. The method includes obtaining depth information of the 3D character, wherein the depth information of the 3D character may be depth information used to indicate position information; recognizing the 3D character based on the depth information. A recognition result of the recognizing the 3D character may include a two-dimensional image corresponding to the 3D character and/or a character meaning corresponding to the 3D character.

18 Claims, 13 Drawing Sheets

(51) Int. Cl.
*G06V 30/148* (2022.01)
*G06V 30/162* (2022.01)
*G06V 30/18* (2022.01)
*G06V 30/22* (2022.01)

(52) U.S. Cl.
CPC .......... *G06V 30/148* (2022.01); *G06V 30/162* (2022.01); *G06V 30/1801* (2022.01); *G06V 30/22* (2022.01); *G06T 2207/10028* (2013.01); *G06T 2207/30164* (2013.01)

(58) Field of Classification Search
CPC .... G06V 30/10; G06V 30/148; G06V 30/162; G06V 30/1801; G06V 30/22
See application file for complete search history.

(56) References Cited

U.S. PATENT DOCUMENTS

| | | | | |
|---|---|---|---|---|
| 2016/0127625 | A1* | 5/2016 | Hanel | H04N 7/18 348/148 |
| 2018/0197285 | A1* | 7/2018 | Vinciguerra | G06T 7/001 |
| 2019/0156472 | A1* | 5/2019 | Link | G06T 7/001 |
| 2021/0133470 | A1* | 5/2021 | Zhang | G06V 20/64 |

FOREIGN PATENT DOCUMENTS

| | | | |
|---|---|---|---|
| CN | 103903300 | A | 7/2014 |
| CN | 103955684 | A | 7/2014 |
| CN | 107292309 | A | 10/2017 |
| CN | 108629238 | A | 10/2018 |
| CN | 109753963 | A * | 5/2019 |
| CN | 110210496 | A | 9/2019 |
| CN | 110375645 | A | 10/2019 |
| CN | 111723866 | A | 9/2020 |
| CN | 113178080 | A | 7/2021 |

OTHER PUBLICATIONS

Written Opinion in PCT/CN2021/135039 mailed on Aug. 30, 2022, 6 pages.

* cited by examiner

300

400

500

600

900

1200

1300

METHODS AND SYSTEMS FOR THREE-DIMENSIONAL CHARACTER RECOGNITION

TECHNICAL FIELD

The present disclosure relates to the field of character recognition, and in particular, to methods and systems for recognizing three-dimensional characters.

BACKGROUND

There is at least one three-dimensional (3D) character processed on the surface of various workpieces, which may be used to represent some information, such as the production dates, the production batches, and identity information, etc., of the workpieces. This information may be useful for production and life.

Therefore, it is desirable to provide a method and a system for recognizing 3D character with improved accuracy.

SUMMARY

One of the embodiments of the present disclosure provides a method for recognizing a three-dimensional (3D) character. The method may include obtaining depth information of a 3D character; and recognizing the 3D character based on the depth information.

In some embodiments, the depth information may include point cloud data. The obtaining depth information of a 3D character may include obtaining the point cloud data of the 3D character; and the recognizing the 3D character based on the depth information may include recognizing the 3D character based on the 3D character point cloud data of the 3D character.

In some embodiments, a recognition result of the 3D character may include a two-dimensional (2D) image corresponding to the depth information of the 3D character and/or a character meaning corresponding to the 3D character.

In some embodiments, the recognizing the 3D character based on the depth information may include determining a corresponding 2D image based on the point cloud data of the 3D character.

In some embodiments, the method may further include determining the character meaning of the 3D character based on the 2D image.

In some embodiments, the determining the character meaning of the 3D character based on the 2D image may include determining the character meaning of the 3D character by recognizing the 2D image using a predetermined character recognition algorithm.

In some embodiments, the obtaining depth information of the 3D character may include obtaining a plurality of 2D images of the 3D character at different angles; and reconstructing the depth information of the 3D character based on the plurality of 2D images.

In some embodiments, a type of the 3D character may include at least one of a letter, a number, a text, a 2D code, or a barcode.

In some embodiments, the 3D character may include more than two characters, and the recognizing the 3D character based on the point cloud data of the 3D character may include segmenting the 3D character based on the point cloud data of the 3D character to obtain the point cloud data of a segmented 3D character.

In some embodiments, the segmenting the 3D character based on the point cloud data of the 3D character may include determining a reference baseline based on the 3D character; obtaining a projection result by projecting the point cloud data of the 3D character to the reference baseline; and determining a segmentation boundary based on the projection result.

In some embodiments, the determining a reference baseline based on the 3D character may include determining the reference baseline based on midlines of the 3D character in a height direction and a thickness direction.

In some embodiments, the projecting the point cloud data of the 3D character to the reference baseline may include projecting the point cloud data of the 3D character to the reference baseline in a direction perpendicular to the reference baseline.

In some embodiments, the recognizing the 3D character based on the point cloud data of the 3D character further may include determining a character outline based on the point cloud data of the segmented 3D character.

In some embodiments, the determining a character outline based on the point cloud data of the segmented 3D character may include determining a reference base plane based on the point cloud data of the segmented 3D character; obtaining a projection result by projecting the point cloud data of the segmented 3D character to the reference base plane; and determining the character outline of the segmented 3D character based on the projection result.

In some embodiments, the determining a reference base plane based on the segmented 3D character may include determining the reference base plane based on a predetermined algorithm and the point cloud data of the segmented 3D character.

In some embodiments, the 3D character may include at least one character, and the recognizing the 3D character based on the point cloud data of the 3D character may include determining a reference base plane based on the point cloud data of the 3D character; obtaining a projection result by projecting the 3D character to the reference base plane; and determining a character outline of the 3D character based on the projection result.

In some embodiments, the determining a reference base plane based on the 3D character includes determining the reference base plane based on a predetermined algorithm and the point cloud data of the 3D character.

In some embodiments, the predetermined algorithm may include a least square algorithm or a Chebyshev algorithm.

In some embodiments, the recognizing the 3D character based on the point cloud data of the 3D character may further includes determining a corresponding 2D image based on a recognition result of the character outline of the 3D character. In some embodiments, the 2D image may be a binarized image. The determining a corresponding 2D image based on a recognition result of the character outline of the 3D character may include marking a point corresponding to the character outline of the 3D character as 0; marking a point corresponding to a background other than the 3D character as 1; or marking the point corresponding to the character outline of the 3D character as 1; marking the point corresponding to the background other than the 3D character as 0.

In some embodiments, the 2D image may involve a color including a character color and a background color, and one of the character color and the background color may be black and the other one of the character color and the background color may be white; or one of the character color and the background color may be red and the other one of the character color and the background color may be blue.

In some embodiments, the recognizing the 3D character based on the point cloud data of the 3D character may include generating at least one added point cloud data by processing the point cloud data of the 3D character; and determining a character outline of the 3D character based on the at least one added point cloud data and the point cloud data of the 3D character.

In some embodiments, the determining a character outline of the 3D character based on the at least one added point cloud data and the point cloud data of the 3D character may include determining projection data based on the at least one added point cloud data and the point cloud data of the 3D character; and determining the character outline of the 3D character based on the projection data.

In some embodiments, the generating at least one added point cloud data by processing the point cloud data of the 3D character may include obtaining position information of two point cloud data in point cloud data of single characters after segmentation; and generating added point cloud data between the two point cloud data based on the position information of the two point cloud data.

In some embodiments, the generating at least one added point cloud data by processing the point cloud data of the 3D character may include obtaining position information of two adjacent point cloud data in the point cloud data of the 3D character; and generating the added point cloud data between the two adjacent point cloud data based on the position information of the two adjacent point cloud data.

In some embodiments, the obtaining position information of two adjacent point cloud data in the point cloud data of the 3D character may include obtaining position information of at least one of the point cloud data of the 3D character to be as position information of initial point cloud data; and determining position information of adjacent point cloud data near the initial point cloud data based on the position information of the initial point cloud data and a distance threshold.

In some embodiments, the point cloud data of the 3D character may be acquired by a character information acquisition device, the distance threshold may be greater than a resolution of the character information acquisition device; and the resolution may be used to reflect a distance between two adjacent points in the point cloud data acquired by the character information acquisition device.

In some embodiments, the generating at least one added point cloud data between two point cloud data may include generating the added point cloud data between two point cloud data based on an interpolation algorithm.

In some embodiments, a 2D image and/or the depth information of the 3D character may be acquired by a character information acquisition device.

In some embodiments, the character information acquisition device may include a camera device, and the camera device includes a depth camera and/or a flat camera.

In some embodiments, the depth camera may include a structured light camera.

In some embodiments, the character information acquisition device may further include one or more light sources, a count of the one or more light sources is within a range of 1-6.

In some embodiments, at least one of the one or more light sources may be a monochromatic light source.

In some embodiments, the count of the one or more light sources may be 2, and the two light sources may be vertically distributed to irradiate the 3D character.

In some embodiments, a color of the at least one of the one or more light sources may include red, blue, or white.

In some embodiments, the method may further include obtaining information of a workpiece where the 3D character is located; and determining a color of a light source based on the information about the workpiece where the 3D character is located.

In some embodiments, the information of the workpiece may include a color of a surface of the workpiece where the 3D character is located.

In some embodiments, the information of the workpiece may include the color of the surface of the workpiece where the 3D character is located; and the determining the color of the light source based on the information of the workpiece where the 3D character is located may include determining a color that is different from the color of the workpiece where the 3D character is located as the color of the light source.

In some embodiments, the 3D character may include more than two characters, and the recognizing the 3D character based on the point cloud data of the 3D character may include determining at least one of the point cloud data of the 3D character as initial point cloud data; determining relevance point cloud data based on the initial point cloud data and a distance threshold; and determining point cloud data of one of the more than two characters based on the relevance point cloud data and the initial point cloud data. A distance between any two adjacent point cloud data in the relevance point cloud data may be within the distance threshold.

In some embodiments, the determining relevance point cloud data based on the initial point cloud data and the distance threshold may include determining point cloud data having a distance from the initial point cloud data within the distance threshold as first relevance point cloud data; determining point cloud data having a distance from the first relevance point cloud data within the distance threshold, as second relevance point cloud data; and determining point cloud data having a distance from Nth relevance point cloud data within the distance threshold, as final associated point cloud data.

In some embodiments, the initial point cloud data may include one or more point cloud data.

In some embodiments, the initial point cloud data may be randomly acquired from the point cloud data of the 3D character.

In some embodiments, the initial point cloud data may be point cloud data first acquired when traversing the point cloud data of the 3D character.

In some embodiments, the method may further include extracting the point cloud data of the one of the more than two characters among the point cloud data of the 3D character; and determining remaining point cloud data of the 3D character.

In some embodiments, the method may further include obtaining at least one initial point cloud data from the remaining point cloud data; determining the relevance point cloud data among the remaining point cloud data based on the at least one initial point cloud data in the remaining point cloud data and the distance threshold; and determining point cloud data of one character in the remaining point cloud data based on the at least one point cloud data among the remaining point cloud data and the at least one initial point cloud data among the remaining point cloud data.

In some embodiments, the method may further include obtaining line and column information of the 3D character; and determining a line character of the 3D character based on the line and column information after determining point cloud data of all single characters in the point cloud data of the 3D character.

In some embodiments, the distance threshold may be within a range of 50 microns-1 millimeter.

In some embodiments, the distance threshold may be less than a character distance between two adjacent characters and/or a line distance between two adjacent lines of characters in the 3D character.

In some embodiments, the point cloud data of the 3D character may be acquired by a character information acquisition device, and the distance threshold may be greater than a resolution of the character information acquisition device. The resolution may be used to reflect a distance between two adjacent points in the point cloud data acquired by the character information acquisition device.

In some embodiments, the determining relevance point cloud data based on the initial point cloud data and a distance threshold may further include projecting the point cloud data of the 3D character to a reference base plane to determine projection points of the point cloud data of the 3D character; determining, among the projection points, a projection point of point cloud data having a distance from the projection point of the initial point cloud data within the distance threshold, as a first relevance projection point; determining a projection point having a distance from the first relevance projection point within the distance threshold, as a second relevance projection point; and determining a projection point having a distance from an Nth relevance projection point within the distance threshold, as a final relevance projection point.

In some embodiments, the method may further include obtaining predetermined information of the 3D character; and determining a resolution of a character information acquisition device configured to acquire the point cloud data of the 3D character based on the predetermined information of the 3D character. The predetermined information of the 3D character may include at least one of a line width of the 3D character, a character distance between two adjacent characters, and a line distance between two adjacent lines of characters. The resolution may be used to reflect a distance between two adjacent points in the point cloud data acquired by the character information acquisition device.

In some embodiments, the determining the resolution of a character information acquisition device used to acquire the point cloud data of the 3D character may include determining the resolution of the character information acquisition device based on a minimum value of the line width, the character distance, and the line distance.

In some embodiments, a ratio of the line width, the character distance, or the line distance to the resolution of the character information acquisition device may be within a range of 5-10.

In some embodiments, the obtaining predetermined information of the 3D character may include obtaining the predetermined information of the 3D character based on input information of a terminal device.

In some embodiments, the input information of the terminal device may include specific numerical information of the predetermined information of the 3D character or two-dimensional code information corresponding to the specific numerical information.

In some embodiments, the method may further include determining a search radius of relevance point cloud data in the point cloud data of the 3D character based on the resolution of the character information acquisition device. The relevance point cloud data in the point cloud data of the 3D character may be used to reflect point cloud data of a single character.

In some embodiments, the method may further include obtaining the resolution of the character information acquisition device configured to acquire the point cloud data of the 3D character; and determining a search radius of relevance point cloud data in the point cloud data of the 3D character based on the resolution. The relevance point cloud data in the point cloud data of the 3D character may be used to reflect point cloud data of a single character.

In some embodiments, the obtaining the resolution of the character information acquisition device configured to acquire the point cloud data of the 3D character may include obtaining the resolution of the character information acquisition device based on the input information of the terminal device.

In some embodiments, the obtaining the point cloud data of the 3D character may include obtaining overall point cloud data of the 3D character and the surface of the workpiece where the 3D character is located; obtaining 3D model information of the surface of the workpiece where the 3D character is located; and determining the point cloud data of the 3D character based on the overall point cloud data and the 3D model information.

In some embodiments, the determining the point cloud data of the 3D character based on the overall point cloud data and the 3D model information may include determining point cloud data of the surface of the workpiece in the overall point cloud data based on the overall point cloud data and the 3D model information; and determining the point cloud data of the 3D character based on the point cloud data of the surface of the workpiece.

In some embodiments, the determining point cloud data of the surface of the workpiece in the overall point cloud data based on the overall point cloud data and the 3D model information may include determining base plane point cloud data in the overall point cloud data that matches the 3D model information of the surface of the workpiece based on a predetermined algorithm; and determining point cloud data having a distance from the base plane point cloud data exceeding a predetermined threshold, as the point cloud data of the 3D character.

In some embodiments, the predetermined algorithm may include a 3D optimal matching algorithm, a least squares spatial matching algorithm, or a Chebyshev algorithm.

In some embodiments, the 3D model information of the surface of the workpiece may include a computer aided design (CAD) three-dimensional model.

One of the embodiments of the present disclosure provides a system for recognizing a 3D character. The system may include a depth information acquisition module and a 3D character recognition module. The depth information acquisition module may be configured to obtain depth information of the 3D character. The 3D character recognition module may be configured to recognize the 3D character based on the depth information.

In some embodiments, the depth information may include point cloud data. The depth information acquisition module may be further configured to obtain point cloud data of the 3D character. The 3D character recognition module may be further configured to recognize the 3D character based on the point cloud data of the 3D character.

In some embodiments, a recognition result of the 3D character may include a 2D image corresponding to the depth information of the 3D character and/or a character meaning corresponding to the 3D character.

In some embodiments, the 3D character recognition module may be further configured to determine a corresponding 2D image based on the point cloud data of the 3D character.

In some embodiments, the 3D character recognition module may be further configured to determine a character meaning of the 3D character based on the 2D image.

In some embodiments, the 3D character recognition module may be further configured to recognize the 2D image using a predetermined character recognition algorithm to determine the character meaning of the 3D character.

In some embodiments, the depth information acquisition module may be further configured to obtain a plurality of 2D images of the 3D character at different angles; and reconstruct the depth information of the 3D character based on the plurality of 2D images.

In some embodiments, a type of the 3D character may include at least one of a letter, a number, a text, a 2D code, or a barcode.

In some embodiments, the 3D character may include more than two characters, the 3D character recognition module may include a character segmentation unit, and the character segmentation unit may be configured to segment the 3D character based on the point cloud data of the 3D character to obtain point cloud data of a segmented 3D character.

In some embodiments, the character segmentation unit may be further configured to determine a reference baseline based on the 3D character; obtain a projection result by projecting the point cloud data of the 3D character to the reference baseline; and determine a segmentation boundary based on the projection result.

In some embodiments, the character segmentation unit may be further configured to determine the reference baseline based on midlines of the 3D character in a height direction and a thickness direction.

In some embodiments, the character segmentation unit may be further configured to project the point cloud data of the 3D character to the reference baseline in a direction perpendicular to the reference baseline.

In some embodiments, the 3D character recognition module may further include a character search unit, and the character search unit may be configured to determine a character outline based on the point cloud data of the segmented 3D character.

In some embodiments, the character search unit may be further configured to determine a reference base plane based on the point cloud data of the segmented 3D character; obtain a projection result by projecting the point cloud data of the segmented 3D character to the reference base plane; and determine a character outline of the segmented 3D character based on the projection result.

In some embodiments, the character search unit may be further configured to determine the reference base plane based on a predetermined algorithm and the point cloud data of the segmented 3D character.

In some embodiments, the 3D character may include at least one character, and the 3D character recognition module may be further configured to determine a reference base plane based on the point cloud data of the 3D character; obtain a projection result by projecting the point cloud data of the 3D character to the reference base plane; and determine a character outline of the 3D character based on the projection result.

In some embodiments, the 3D character recognition module may be further configured to determine the reference base plane based on a predetermined algorithm and the point cloud data of the 3D character.

In some embodiments, the predetermined algorithm may include a least square algorithm or a Chebyshev algorithm.

In some embodiments, the 3D character recognition module may further include a 2D image determination unit configured to determine a corresponding 2D image based on a recognition result of a character outline of the 3D character.

In some embodiments, the 2D image may be a binarized image. The 2D image determination unit may be further configured to mark a point corresponding to the character outline of the 3D character as 0; mark a point corresponding to a background other than the 3D character as 1; or mark the point corresponding to the character outline of the 3D character as 1; mark the point corresponding to the background other than the 3D character as 0.

In some embodiments, the 2D image may involve a color including a character color and a background color. One of the character color and the background color may be black and the other one of the character color and the background color may be white; or one of the character color and the background color may be red and the other one of the character color and the background color may be blue.

In some embodiments, the character search unit may be further configured to generate at least one added point cloud data by processing the point cloud data of the 3D character; and determine a character outline of the 3D character based on the at least one added point cloud data and the point cloud data of the 3D character.

In some embodiments, the character search unit may be further configured to determine projection data based on the added point cloud data and the point cloud data of the 3D character; and determine the character outline of the 3D character based on the projection data.

In some embodiments, the character search unit may be further configured to obtain position information of two point cloud data in point cloud data of single characters after segmentation; and generate the added point cloud data between the two point cloud data based on the position information of the two point cloud data.

In some embodiments, the character search unit may be further configured to obtain position information of two adjacent point cloud data in the point cloud data of the 3D character; and generate the added point cloud data between the two adjacent point cloud data based on the position information of the two adjacent point cloud data.

In some embodiments, the character search unit may be further configured to obtain position information of at least one of the point cloud data of the 3D character to be as position information of initial point cloud data; and determine position information of adjacent point cloud data near the initial point cloud data based on the position information of the initial point cloud data and a distance threshold.

In some embodiments, the point cloud data of the 3D character may be acquired by a character information acquisition device, and the distance threshold may be greater than a resolution of the character information acquisition device. The resolution may be used to reflect a distance between two adjacent points in the point cloud data acquired by the character information acquisition device.

In some embodiments, the character search unit may be further configured to generate added point cloud data between two point cloud data based on an interpolation algorithm.

In some embodiments, a 2D image and/or depth information of the 3D character may be acquired by a character information acquisition device.

In some embodiments, the character information acquisition device may include a camera device, and the camera device includes a depth camera and/or a flat camera.

In some embodiments, the depth camera may include a structured light camera.

In some embodiments, the character information acquisition device further may include one or more light sources, and a count of the one or more light sources may be within a range of 1-6.

In some embodiments, at least one of the one or more light sources may be a monochromatic light source.

In some embodiments, the count of the one or more light sources may be 2, and the two light sources may be vertically distributed to irradiate the 3D character.

In some embodiments, a color of the at least one of the one or more light sources may include red, blue, or white.

In some embodiments, the system may further include a workpiece information acquisition module and a light source color determination module. The workpiece information acquisition module may be configured to obtain information of a workpiece where the 3D character is located. The light source color determination module may be configured to determine a color of a light source based on the information of the workpiece where the 3D character is located.

In some embodiments, the information of the workpiece may include a color of a surface of the workpiece where the 3D character is located.

In some embodiments, the information of the workpiece may include the color of the surface of the workpiece where the 3D character is located. The light source color determination module may be further configured to determine a color that is different from the color of the workpiece where the 3D character is located as the color of the light source.

In some embodiments, the 3D character may include more than two characters. The 3D character recognition module may be further configured to determine at least one of the point cloud data of the 3D character as initial point cloud data, and determine relevance point cloud data based on the initial point cloud data and a distance threshold; and determine point cloud data of one of the more than two characters based on the relevance point cloud data and the initial point cloud data. A distance between any two adjacent point cloud data in the relevance point cloud data may be within the distance threshold.

In some embodiments, the 3D character recognition module may be further configured to determine point cloud data having a distance from the initial point cloud data within the distance threshold, as first relevance point cloud data; determine point cloud data having a distance from the first relevance point cloud data within the distance threshold, as second relevance point cloud data; and determine point cloud data having a distance from Nth relevance point cloud data within the distance threshold, as final relevance point cloud data.

In some embodiments, the initial point cloud data may include one or more point cloud data.

In some embodiments, the initial point cloud data may be randomly acquired from the point cloud data of the 3D character.

In some embodiments, the initial point cloud data may be point cloud data first acquired when traversing the point cloud data of the 3D character.

In some embodiments, the 3D character recognition module may be further configured to extract the point cloud data of one of the more than two characters among the point cloud data of the 3D character and determine remaining point cloud data of the 3D character.

In some embodiments, the 3D character recognition module may be further configured to obtain at least one initial point cloud data from the remaining point cloud data; determine the relevance point cloud data among the remaining point cloud data based on the at least one initial point cloud data in the remaining point cloud data and the distance threshold; and determine point cloud data of one character in the remaining point cloud data based on the at least one point cloud data among the remaining point cloud data and the at least one initial point cloud data among the remaining point cloud data.

In some embodiments, the 3D character recognition module may be further configured to obtain line and column information of the 3D character; and determine a line character of the 3D character based on the line and column information after determining point cloud data of all individual characters in the point cloud data of the 3D character.

In some embodiments, the distance threshold may be within a range of 50 microns-1 millimeter.

In some embodiments, the distance threshold may be less than a character distance between two adjacent characters and/or a line distance between two adjacent lines of characters in the 3D character.

In some embodiments, the point cloud data of the 3D character may be acquired by a character information acquisition device, and the distance threshold may be greater than a resolution of the character information acquisition device. The resolution may be used to reflect a distance between two adjacent points in the point cloud data acquired by the character information acquisition device.

In some embodiments, the 3D character recognition module may be further configured to project the point cloud data of the 3D character to a reference base plane to determine projection points of the point cloud data of the 3D character; determine, among the projection points, a projection point of point cloud data having a distance from the projection point of the initial point cloud data within the distance threshold, as a first relevance projection point; determine a projection point having a distance from the first relevance projection point within the distance threshold, as a second relevance projection point; and determine a projection point having a distance from an Nth relevance projection point within the distance threshold, as a final relevance projection point.

In some embodiments, the system may further include a workpiece information acquisition module, and the workpiece information acquisition module may be configured to obtain predetermined information of the 3D character; and determine a resolution of a character information acquisition device configured to acquire the point cloud data of the 3D character based on the predetermined information of the 3D character. The predetermined information of the 3D character may include at least one of a line width of the 3D character, a character distance between two adjacent characters, and a line distance between two adjacent lines of characters. The resolution may be used to reflect a distance between two adjacent points in the point cloud data acquired by the character information acquisition device.

In some embodiments, the workpiece information acquisition module may be further configured to determine the resolution of the character information acquisition device based on a minimum value of the line width, the character distance, and the line distance.

In some embodiments, a ratio of the line width, the character distance, or the line distance to the resolution of the character information acquisition device may be within a range of 5-10.

In some embodiments, the workpiece information acquisition module may obtain the predetermined information of the 3D character based on input information of a terminal device.

In some embodiments, the input information of the terminal device may include specific numerical information of the predetermined information of the 3D character or two-dimensional code information corresponding to the specific numerical information.

In some embodiments, the workpiece information acquisition module may be further configured to determine a search radius of relevance point cloud data in the point cloud data of the 3D character based on the resolution of the character information acquisition device.

The relevance point cloud data in the point cloud data of the 3D character may be used to reflect point cloud data of a single character.

In some embodiments, the workpiece information acquisition module may be further configured to obtain the resolution of the character information acquisition device configured to acquire the point cloud data of the 3D character; and determine a search radius of relevance point cloud data in the point cloud data of the 3D character based on the resolution.

The associated point cloud data in the point cloud data of the 3D character may be used to reflect point cloud data of a single character.

In some embodiments, the workpiece information acquisition module may obtain the resolution of the character information acquisition device based on input information of a terminal device.

In some embodiments, the depth information acquisition module may be further configured to obtain overall point cloud data of the 3D character and a surface of a workpiece where the 3D character is located; obtain 3D model information of the surface of the workpiece where the 3D character is located; and determine the point cloud data of the 3D character based on the overall point cloud data and the 3D model information.

In some embodiments, the depth information acquisition module may be further configured to determine point cloud data of the surface of the workpiece in the overall point cloud data based on the overall point cloud data and the 3D model information; and determine the point cloud data of the 3D character based on the point cloud data of the surface of the workpiece.

In some embodiments, the depth information acquisition module may be further configured to determine base plane point cloud data in the overall point cloud data that matches the 3D model information of the surface of the workpiece based on a predetermined algorithm; and determine point cloud data having a distance from the base plane point cloud data exceeding a predetermined threshold, as the point cloud data of the 3D character.

In some embodiments, the predetermined algorithm may include a 3D optimal matching algorithm, a least squares spatial matching algorithm, or a Chebyshev algorithm.

In some embodiments, the 3D model information of the surface of the workpiece may include a computer aided design (CAD) three-dimensional model.

BRIEF DESCRIPTION OF THE DRAWINGS

The present disclosure is further illustrated in terms of exemplary embodiments.

These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
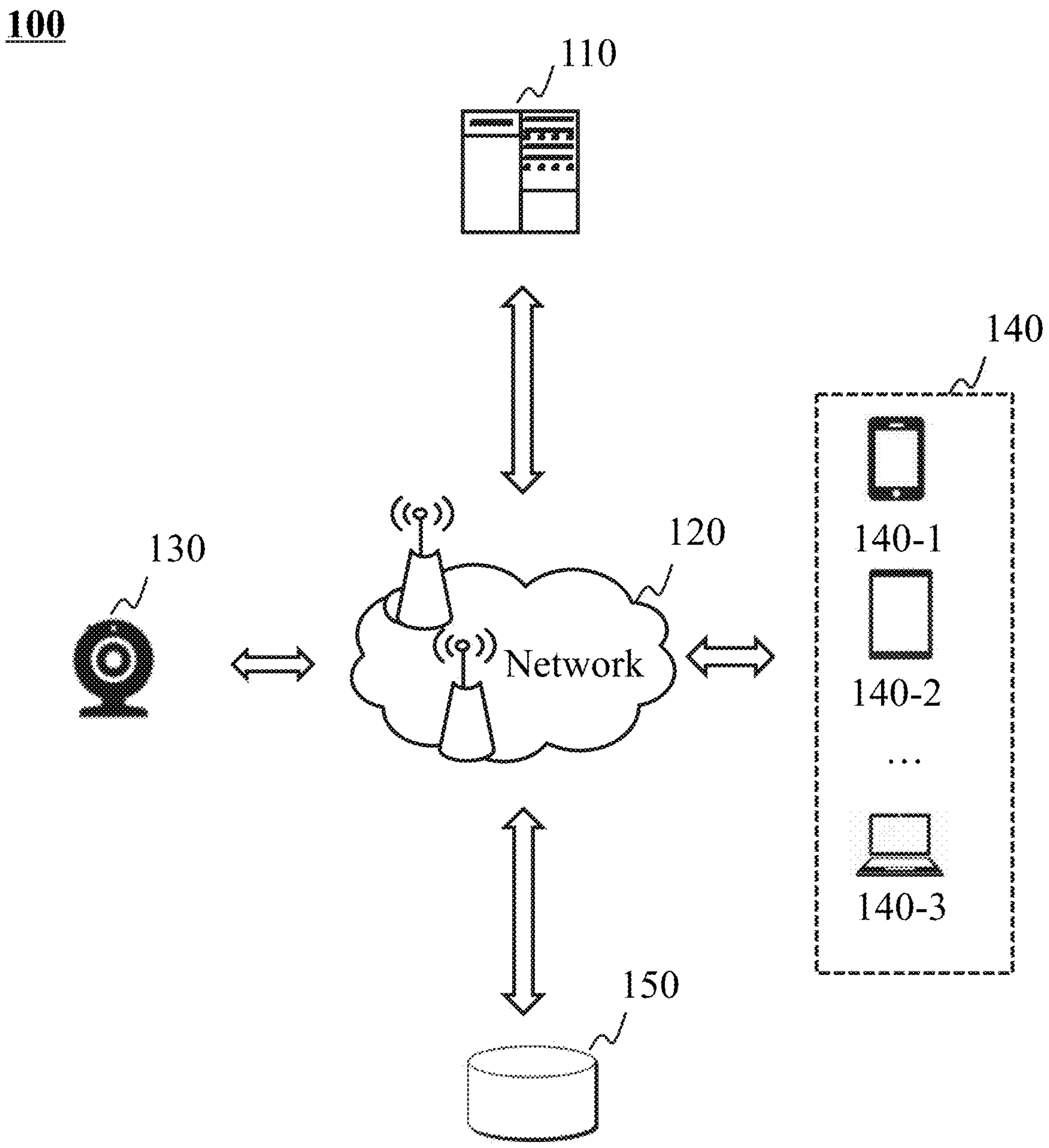
FIG. 1 is a schematic diagram illustrating an exemplary system for recognizing a three-dimensional (3D) character according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. It should be understood that these exemplary embodiments are given merely to enable those skilled in the relevant field to better understand and thus realize the present disclosure and are not intended to limit the scope of the present disclosure in any way. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

While the present disclosure makes various references to certain modules or units in the system according to the embodiments of the present disclosure, however, any number of different modules or units may be used and run on a client and/or a server. The described modules are illustrative only, and different modules may be used for different aspects of the described systems and methods.

Flowcharts are used in the present disclosure to illustrate operations performed by a system according to the embodiments of the present disclosure. It should be appreciated that the preceding or following operations are not necessarily performed in an exact sequence. Instead, steps may be processed in reverse order or simultaneously. Also, it is possible to add other operations to these processes or remove a step or steps from them.

One or more embodiments of the present disclosure provide a system and a method for recognizing at least one three-dimensional (3D) character on a surface of a workpiece. In some embodiments, the 3D character may be raised and/or recessed on the surface of the workpiece. The surface of the workpiece may be flat or curved. The characters may be at least one of a text, a number, a pattern, a string, a QR code, a barcode, etc., or a combination thereof. For example, the characters may be an identification code embossed on a liquefied petroleum gas cylinder bottle, a spray code on a beverage bottle, a string processed by a punch or a laser on a machined workpiece, or the like. As another example, the characters may be a card number on a bank card, a steel stamp on a nameplate of a motor housing, or the like. As yet another example, the characters may be embossed characters on a metal part, exemplarily, embossed characters on a key part on an aircraft engine, embossed characters on a key part of an automobile engine, or the like. In some embodiments, an image of a 3D character may be captured by a 2D camera, and the image may then be processed by using a character recognition algorithm to recognize the 3D character. In some embodiments, depth information of the 3D character may be recognized, and then the 3D character is recognized based on the depth information.

FIG. 1 is a schematic diagram illustrating an exemplary system for recognizing a three-dimensional (3D) character according to some embodiments of the present disclosure.

As shown in FIG. 1, a system for recognizing a 3D character 100 (also referred to as the system 100 hereinafter) may include a processing device 110, a network 120, a character information acquisition device 130, a terminal device 140, and a storage device 150.

In some embodiments, a recognition result of the 3D character in the system 100 may be helpful for production and life. In some embodiments, the system 100 may be applied in a production management device (e.g., a workpiece transportation management device, a warehouse management device, etc.) of a workpiece for production management of the workpiece. For example, the system 100 may be applied in a warehouse management device for recognizing at least one 3D character embossed on a workpiece. The 3D character may have qualification information of the workpiece. The system 100 may recognize the qualification information of the workpiece corresponding to the 3D character and determine whether the workpiece is qualified. The warehouse management device may determine whether to store the workpiece according to a judgment result of the system 100. As another example, the system 100 may be applied in a workpiece transportation management device for recognizing at least one 3D character sprayed on a workpiece. The 3D character may represent production batch information of the workpiece. The system 100 may recognize the production batch information of the workpiece corresponding to the 3D character and determine whether the workpiece is to be transported. The workpiece transportation management device may determine whether to transport the workpiece based on a judgment result of the system 100.

In some embodiments, the system 100 may be applied in a metal component recognition device. For example, the system 100 may be applied in a key component recognition device of an aero-engine for recognizing one or more 3D characters processed on a surface of a key component (e.g., an engine blade, a bearing, etc.) of the aero-engine and obtaining relevant information (e.g., a model type, a number, etc.) of the key component of the aero-engine. As another example, the system 100 may be applied in a key component recognition device of an automobile engine for recognizing at least one 3D characters processed on a surface of a key component of the automobile engine (e.g., a high-pressure fuel pump, a valve spring, a camshaft, or the like), and obtaining information (e.g., a model type, a number, or the like) related to the key component of the automobile engine.

In some embodiments, the system 100 may be applied in an identity verification device (e.g., a bank card account identification device, an attendance device, an authority verification device, etc.) for identity information verification. For example, the system 100 may be applied in a recognition device for recognizing at least one 3D character on a bank card, and the 3D character on the bank card may correspond to a bank card account number of a user. Further, the bank card account number identification device may determine whether the bank card account is legitimate based on a bank card account number that corresponds to the 3D character recognized by the system 100. As another example, the system 100 may be applied to an attendance device for recognizing at least one 3D character on a work badge of an employee, and the 3D character on a work badge may correspond to employee identity information. Further, based on the employee identification information corresponding to the 3D character recognized by the system 100, the attendance device may update employee data in a storage device 150 and record a current moment for recognizing the 3D character recognized by the system 100, which are designated as attendance information of the employee. As another example, the system 100 may be applied in a privilege verification device for recognizing at least one 3D character on an electronic device, and the 3D character on the electronic device may correspond to electronic device privilege information. Furthermore, based on the electronic device privilege information corresponding to the 3D character recognized by the system 100, the privilege verification device may determine whether to grant permission for switching on and off, entering the system, downloading software, and other operation requests of the electronic device, as well as a permission to use an application program therein. It should be noted that the system 100 may be applied to other devices, scenes, and/or applications that require 3D character recognition, which is not limited herein. Any device, scene and/or application program that may use the identity confirmation manner contained in the present disclosure is within the scope of protection of the present disclosure.

In some embodiments, the processing device 110 may be used to process information and/or data related to 3D character recognition. For example, the processing device 110 may determine depth information of the 3D character based on information of the 3D character acquired by a character information acquisition device 130, and recognize the 3D character based on the depth information of the 3D character. In some embodiments, the result of recognizing the 3D character by the processing device 110 may be a two-dimensional (2D) image corresponding to the depth information of the 3D character. For example, the processing device 110 may determine a 2D image corresponding to the depth information of the 3D character based on the depth information of the 3D character. In other embodiments, the result of recognizing the 3D character by the processing device 110 may be a character meaning corresponding to the 3D character. For example, the processing device 110 may determine the meaning of the 3D character based on the depth information of the 3D character via a trained machine learning model. Exemplarily, the trained machine learning model may include, but is not limited to, a deep neural network model, a recurrent neural network model, a customized model structure, etc. As another example, the processing device 110 may determine a corresponding 2D image based on the depth information of the 3D character and recognize the character meaning of the 3D character based on the 2D image corresponding to the depth information of the 3D character.

In some embodiments, the processing device 110 may be regional or remote. For example, the processing device 110 may access information and/or materials stored in the character information acquisition device 130 and the terminal device 140 via the network 120. In some embodiments, the processing device 110 may be directly connected with the character information acquisition device 130 and the terminal device 140 to access information and/or materials stored therein. For example, the processing device 110 may be disposed in or directly connected with the character information acquisition device 130.

In some embodiments, the processing device 110 may include a processor. The processor may process data and/or information related to 3D character recognition to perform one or more of the functions described in the present disclosure. For example, the processor may receive a 3D character recognition request signal sent by the character information acquisition device 130 or the terminal device 140 and send control instructions to the character information acquisition device 130. As another example, the processor may obtain an image of the 3D character acquired by the character information acquisition device 130, and send a recognition result of the 3D character to the terminal device 140 after recognizing the 3D character based on the depth information of the 3D character.

The network 120 may facilitate the exchange of data and/or information in the system 100. In some embodiments, one or more components of the system 100 (e.g., the processing device 110, the character information acquisition device 130, and the terminal device 140) may send data and/or information to other components of the system 100 via the network 120. For example, the information of the 3D character acquired by the character information acquisition device 130 may be transmitted to the processing device 110 via the network 120. As another example, the recognition result of the 3D character in the processing device 110 may be transmitted to the terminal device 140 via the network 120.

The character information acquisition device 130 is configured to acquire information related to the 3D character. In some embodiments, the character information acquisition device 130 may acquire the depth information of the 3D character and/or depth information of the 2D image. In some embodiments, the character information acquisition device may include a camera device and a light source. The light source may be used to irradiate light information to one or more characters on a workpiece, and the camera device may be configured to capture light signals irradiated to the 3D character.

In some embodiments, the camera device may include a depth camera and/or a flat camera. The depth camera is configured to capture the depth information of the 3D character. The flat camera is configured to capture the 2D image of the 3D character. In some embodiments, the depth camera may include a sensor that scans a spatial 3D information of the 3D character to obtain position information (e.g., point cloud data) of a surface of the 3D character. For example, the depth camera may be a sensor that performs spatial scanning of the 3D character by white light interference. As another example, the depth camera may be a sensor that performs spatial scanning of the 3D character by white light confocal. As yet another example, the depth camera may be a structured light camera that projects specific optical information (e.g., crisscrossing laser lines, black and white squares, circles, etc.) from a projector to the 3D character. In some embodiments, the depth camera may include a binocular camera, a time of fight (TOF) camera, or the like. In some embodiments, the character information acquisition device 130 may acquire the 2D image of the 3D character from different angles via the flat camera, and then perform image processing on the 2D image from different angles to reconstruct the depth information corresponding to the 3D character. In some embodiments, the flat camera may include a black and white camera, a color camera, a scanner, etc., or any combination thereof.

In some embodiments, the light source may project the light information to the 3D character and a surface of the workpiece to enable the depth camera and/or the flat camera to obtain information about the 3D character. In some embodiments, the light source may include a visible light source. The visible light source may be used to project light visible to the human eye, and the visible light source may include a monochromatic light source, a composite light source, etc. The monochromatic light source may be used for light of a single frequency (or wavelength) (e.g., red, orange, yellow, green, blue, violet, etc.), and the composite light source may be used to project light that is a mixture of monochromatic light of different frequencies (or wavelengths). For example, the light source may include a light source for an incandescent lamp, a light source for a fluorescent lamp, etc. In some embodiments, the light source may include an invisible light source, and the invisible light source may be used to project light that is invisible to the human eye (e.g., radio waves, microwaves, infrared light, ultraviolet light, x-rays, γ-rays, far infrared light, etc.). In some embodiments, a count of the light source may be one or more. For example, the count of the light source may be within a range of 1-6. As another example, the count of the light source may be within a range of 2-4. As yet another example, the count of the light source may be 2 or 4. In some embodiments, the light source may include a monochromatic light or a composite light. In some embodiments, a plurality of light sources may be of the same color or may be different.

In some embodiments, the character information acquisition device 130 may be provided on a stationary device or on a mobile device. For example, the character information acquisition device 130 may include a plurality of cameras fixedly provided at different locations, and the character information acquisition device 130 may acquire a plurality of 2D images of the 3D character at different angles by the plurality of cameras provided at different locations. As another example, the character information acquisition device 130 may be provided on a shooting angle adjustment member (e.g., a robotic arm, a handle, etc.), and the character information acquisition device 130 may control the shooting angle adjustment member to drive the character information acquisition device 130 to move so that the character information acquisition device 130 may acquire the 2D image of the 3D character at different angles.

In some embodiments, the mobile device for providing the character information acquisition device 130 may include a wearable device, an industrial processing device, a virtual reality device, an augmented reality device, etc., or any combination thereof. In some embodiments, the wearable device may include a smart bracelet, smart glasses, a smart helmet, etc., or any combination thereof. In some embodiments, the industrial processing device may include a robotic arm, an industrial robot, an automated guided vehicle (AGV) cart, a machine tool, etc., or any combination thereof. In some embodiments, the virtual reality device and/or the augmented reality device may include a virtual reality helmet, virtual reality glasses, a virtual reality eyepatch, an augmented reality helmet, augmented reality glasses, augmented reality eyeshades, or the like, or any combination of the above. For example, the character information acquisition device 130 may be provided on AR glasses. When a user wears the AR glasses, the character information acquisition device 130 on the AR glasses may acquire 3D character information on the workpiece and process 3D character information through the processing device 110, then the 3D character may be recognized. The processing device 110 may directly output the recognition result to a display screen of the AR glasses. The processing device 110 may also retrieve workpiece information corresponding to the recognition result (e.g., a presentation of workpiece information corresponding to the embossed character on the workpiece) for display on the display screen of the AR glasses.

In some embodiments, the terminal device 140 may input and/or output relevant information or data. In some embodiments, the terminal device 140 may obtain a result of recognizing the 3D character generated by the processing device 110. For example, the user may view the 2D image corresponding to the 3D character recognized by the processing device 110 via the terminal device 140. In some embodiments, an output of the terminal device 140 may be a display output or a voice output. For example, the terminal device 140 may employ voice announcements to prompt the user with the character meaning corresponding to the 3D character recognized by the processing device 110. As another example, the terminal device 140 may output the character meaning of the 3D character and/or the 2D image corresponding to the 3D character via a display screen. In some embodiments, the terminal device 140 may be connected with the processing device 110 via the network 120 (e.g., a wired connection and a wireless connection). The user may obtain the result of recognizing the 3D character by the processing device 110 via the terminal device 140, and the result of recognizing the 3D character may be transmitted to the terminal device 140 via the processing device 110. In some embodiments, the user may set an image acquisition parameter of the character information acquisition device 130 via the terminal device 140. The image acquisition parameter of the character information acquisition device 130 may include a light source color parameter, a camera position parameter, a camera shooting angle parameter, or the like. For example, the terminal device 140 may be connected with the character information acquisition device 130 via the network 120 (e.g., wired connection, wireless connection), and the terminal device 140 may upload the image acquisition parameter to the character information acquisition device 130. In some embodiments, the image acquisition parameters may be manually input to the terminal device 140 by the user. In some other embodiments, the image acquisition parameter may be generated by the terminal device 140 based on a push message sent by the character information acquisition device 130. For example, the push message obtained by the terminal device 140 from the character information acquisition device 130 includes a color (e.g., blue, etc.) of the surface of the workpiece where the 3D character is located. The terminal device 140 generates image parameter acquisition information based on the push message, which includes a color of the light source (e.g., red, white, or other colors that do not coincide with the color of the surface of the workpiece, etc.). As another example, the push message obtained by the terminal device 140 from the character information acquisition device 130 includes that a distance between the surface of the workpiece and the light source is 5 cm, and the terminal device 140 generates the image parameter acquisition message, which includes that the height at which the workpiece is located is reduced by 5 cm. In some embodiments, the terminal device 140 may be a portable device with functions such as data acquisition, storage, and/or sending, for example, a smartphone 140-1, a tablet 140-2, a laptop 140-3, a smart camera, etc. or any combination thereof.

The storage device 150 may store information (e.g., the point cloud data of the 3D character, the character meaning corresponding to the 3D character, etc.) and/or an instruction (e.g., an instruction for recognizing the 3D character based on the depth information of the 3D character, an instruction for reconstructing the depth information of the 3D character based on the plurality of 2D images of the 3D character at different angles, etc.). In some embodiments, the storage device 150 may store information obtained from the character information acquisition device 130 and/or the terminal device 140 (e.g., push information about the character information acquisition device 130, the image acquisition parameter, etc.). In some embodiments, the storage device 150 may store the information and/or the instruction for execution or use by the processing device 110 to perform the exemplary method described in the present disclosure. For example, the processing device 110 may reconstruct the depth information of the 3D character based on the point cloud data of the 3D character based on the instruction stored in the storage device 150, and the processing device 110 determines that the character meaning of the 3D character is "11011" including a plurality of digits based on the depth information of the 3D character.

In some embodiments, the storage device 150 may be connected with the network 120 to enable communication with one or more components (e.g., the processing device 110, the character information acquisition device 130, the terminal device 140, etc.) of the system 100. One or more components of the system 100 may access the information or the instruction stored in the storage device 150 via the network 120. In some embodiments, the storage device 150 may be directly connected with or in communication with one or more components (e.g., the processing device 110, the character information acquisition device 130, the terminal device 140) of the system 100. In some embodiments, the storage device 150 may be part of the processing device 110. In some embodiments, the processing device 110 may be provided independently of the character information acquisition device 130. In some embodiments, the processing device 110 may also be provided in the character information acquisition device 130 or the terminal device 140.

It should be noted that the foregoing description is provided for illustrative purposes only and is not intended to limit the scope of the present disclosure. For a person of ordinary skill in the art, a wide variety of variations and modifications may be made under the guidance of the contents of the present disclosure. Features, structures, methods, and other characteristics of the exemplary embodiments described in the present disclosure may be combined in various ways to obtain additional and/or alternative exemplary embodiments.

Figure 2:
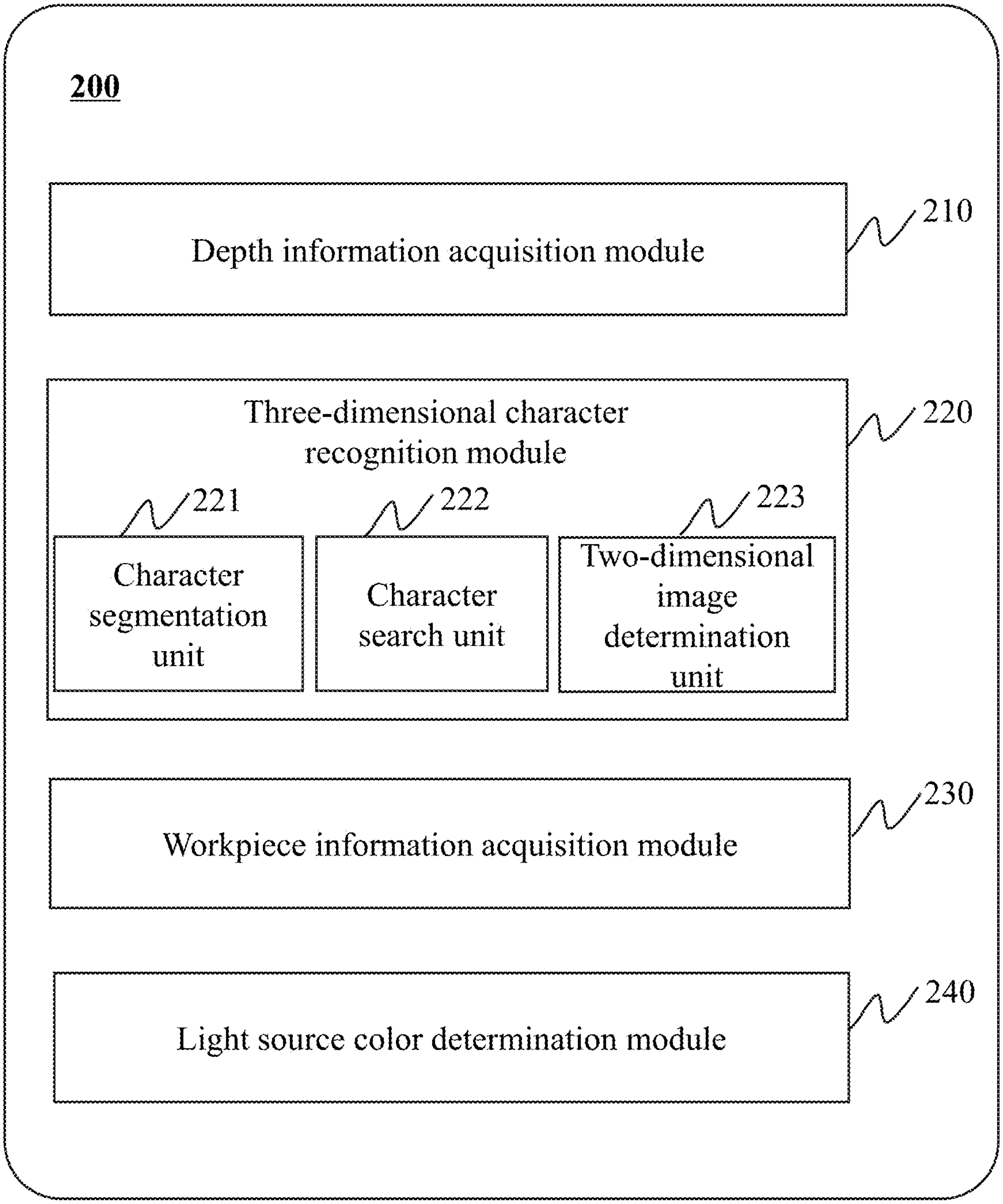
FIG. 2 is a block diagram illustrating an exemplary system for recognizing a 3D character according to some embodiments of the present disclosure.

FIG. 2 is a block diagram illustrating an exemplary system for recognizing a three-dimensional (3D) character according to some embodiments of the present disclosure.

As shown in FIG. 2, in some embodiments, a system for recognizing the 3D character 200 (referred to as the system 200 hereinafter) may include a depth information acquisition module 210, a 3D character recognition module 220, a workpiece information acquisition module 230, and a light source color determination module 240.

The depth information acquisition module 210 may be configured to obtain depth information of the 3D character. In some embodiments, the depth information acquisition module 210 may determine the depth information of the 3D character based on information of the 3D character acquired by the character information acquisition device 130. In some embodiments, the information of the 3D character acquired by the character information acquisition device 130 may be the depth information of the 3D character. For example, the character information acquisition device 130 may obtain position information (e.g., overall point cloud data) of a surface of the 3D character by scanning spatial 3D information of the 3D character via a depth camera. The depth information acquisition module 210 may obtain the depth information of the 3D character by processing the depth information acquired by the character information acquisition device 130. For example, the depth information acquisition module 210 may obtain the point cloud data of the 3D character by segmenting overall point cloud data acquired by the character information acquisition device 130. The overall point cloud data may include 3D point cloud data of the surface of the workpiece and the point cloud data of the 3D character. In some embodiments, the information of the 3D character acquired by the character information acquisition device 130 may be a plurality of two-dimensional (2D) images of the 3D character at different angles. An information processing device may perform image reconstruction on the plurality of 2D images to determine the depth information of the 3D character (e.g., point cloud data that may represent positions of a plurality of points on the surface of the 3D character). In some embodiments, the information processing device may be part of the character information acquisition device 130, and the depth information acquisition module 210 may also obtain the depth information of the 3D character directly from the information processing device. In some embodiments, the information processing device may be independent of the character information acquisition device 130, and the depth information acquisition module 210, after acquiring the plurality of 2D images from the character information acquisition device 130, may also perform image reconstruction to determine the depth information of the 3D character.

In other embodiments, the depth information acquisition module 210 may obtain the plurality of 2D images of the 3D character at different angles and reconstruct the depth information of the 3D character based on the plurality of 2D images. For example, the depth information acquisition module 210 may perform image reconstruction based on the plurality of 2D images to determine the depth information of the 3D character (e.g., the point cloud data that may represent the positions of the plurality of points on the surface of the 3D character). In some embodiments, the depth information acquisition module 210 may obtain the plurality of 2D images of the 3D character at different angles by the character information acquisition device 130.

The 3D character recognition module 220 may be configured to recognize the 3D character based on the depth information. In some embodiments, a result of the 3D character recognition module 220 recognizing the 3D character may be the 2D image corresponding to the 3D character or a character meaning corresponding to the 3D character. In some embodiments, the 3D character recognition module 220 may determine the 2D image corresponding to the 3D character or the character meaning corresponding to the 3D character directly based on the depth information of the 3D character. For example, the 3D character recognition module 220 may also process the depth information of the 3D character directly based on a predetermined algorithm to determine a recognition result (e.g., the 2D image corresponding to the 3D character or the character meaning corresponding to the 3D character). In some embodiments, the 3D character recognition module 220 may also determine the 2D image corresponding to the 3D character based on the depth information of the 3D character, and then recognize the 2D image utilizing a character recognition algorithm to determine the character meaning corresponding to the 3D character.

In some embodiments, the depth information of the 3D character may include the point cloud data, and the 3D character recognition module 220 may also recognize the 3D character based on the point cloud data of the 3D character. In some embodiments, the 3D character recognition module 220 may determine the 2D image or the character meaning corresponding to the 3D character directly based on the point cloud data of the 3D character. For example, the 3D character recognition module 220 may also process the point cloud data of the 3D character directly based on the predetermined algorithm to determine the recognition result (e.g., the 2D image corresponding to the 3D character or the character meaning corresponding to the 3D character). As another example, the 3D character recognition module 220 may determine a reference base plane in a thickness direction of the 3D character based on the predetermined algorithm (e.g., a least square algorithm or a Chebyshev algorithm, etc.), obtain a projection result by projecting the point cloud data of the 3D character to the reference base plane, determine a character outline of the 3D character based on the projection result, and determine a corresponding 2D image based on the character outline of the 3D character. In some embodiments, the 3D character recognition module 220 may also determine the 2D image corresponding to the 3D character based on the point cloud data of the 3D character, and then recognize the 2D image utilizing the character recognition algorithm to determine the character meaning corresponding to the 3D character.

In some embodiments, to make the subsequent method for recognizing characters in the 2D image simpler, for a 3D character including more than two characters, the 3D character recognition module 220 may also segment the 3D character based on the point cloud data of the 3D character and recognize the 3D character based on segmented point cloud data. In some embodiments, the 3D character recognition module 220 may further include a character segmentation unit 221, a character search unit 222, and a 2D image determination unit 223.

The character segmentation unit 221 may be configured to segment the 3D character based on the point cloud data of the 3D character to obtain the point cloud data of a segmented 3D character. In some embodiments, for a 3D character arranged in a plurality of lines, the character segmentation unit 221 may segment the 3D character into a plurality of single line characters. For example, the character segmentation unit 221 may determine a reference baseline along a direction parallel to a height direction of the 3D character. The character segmentation unit 221 may project the point cloud data of the 3D character on the reference baseline to obtain a projection result, determine a segmentation boundary between every two adjacent single line characters based on the projection result, and segment the 3D character containing a plurality of lines of characters into the plurality of single line characters based on the segmentation boundary. In some embodiments, for a single line 3D character including a plurality of single characters, the character segmentation unit 221 may segment the single line 3D character including the plurality of single characters into a plurality of single characters. For example, the character segmentation unit 221 may determine the reference baseline along a direction parallel to a length direction of the single line 3D character. The character segmentation unit 221 may project point cloud data of the single line 3D character including the plurality of single characters to the reference baseline to obtain a projection result, determines a segmentation boundary between every two adjacent single characters based on the projection result, and segments the single line 3D character including the plurality of single characters into the plurality of single characters based on the segmentation boundary.

The character search unit 222 may be configured to determine a corresponding character outline based on the point cloud data of the 3D character of a segmented single character. In some embodiments, the character search unit 222 may determine the reference base plane based on the point cloud data of the segmented 3D character, project point cloud data of the segmented 3D character to the reference base plane to obtain a projection result, and determine a character outline of the segmented 3D character based on the projection result. For example, the character search unit 222 may determine the reference base plane based on the point cloud data of the 3D character of the segmented single line character, project the point cloud data of the 3D character of the segmented single line character to the reference base plane to obtain a projection result, determine a character outline of the segmented single line character based on the projection result, and determine the reference base plane based on the projection result. As another example, the character search unit 222 may determine the reference base plane based on the point cloud data of the 3D character in each segmented lines, project the point cloud data of the 3D character in each segmented single line to the reference base plane to obtain the projection result, and determine the character outline of the 3D character in each segmented single based on the projection result. In some embodiments, the character search unit 222 may determine the reference base plane based on a predetermined algorithm, such as the least square algorithm or the Chebyshev algorithm.

The 2D image determination unit 223 may be configured to determine a corresponding 2D image based on a recognition result of the character outline of the 3D character. In some embodiments, the 2D image determination unit 223 may be configured to determine a corresponding 2D image of the overall 3D character based on a character outline of point cloud data of the overall 3D character. In some embodiments, the 2D image determination unit 223 may also determine a 2D image corresponding to the single line character or the single character based on the character outline of the point cloud data in of the character in each segmented single line or the single character.

The workpiece information acquisition module 230 may be configured to obtain information of a workpiece where at least one 3D character is located. In some embodiments, the information of the workpiece may include color information of a surface of the workpiece where the at least one 3D character is located, etc. In some embodiments, the character information acquisition device 130 may be configured to acquire a 2D image (e.g., an RGB image) of the surface of the workpiece, and the workpiece information acquisition module 230 may acquire the color information, etc., of the surface of the workpiece based on the 2D image of the surface of the workpiece acquired by the character information acquisition device 130.

The light source color determination module 240 may be configured to determine a color of the light source based on the information of the workpiece where the at least one 3D character is located. In some embodiments, the light source color determination module 240 may determine a color of a light source based on the color information of the surface of the workpiece. For example, the workpiece information acquisition module 230 may acquire the color information of the surface of the workpiece as blue based on the 2D image of the surface of the workpiece acquired by the character information acquisition device 130. The light source color determination module 240 may determine the color of the light source based on the color information of the surface of the workpiece. For example, the color of the light source may be inconsistent with the color of the surface of the workpiece and is exemplarily red, white, etc.

It should be noted that the above description of the system for recognizing the character and its modules is for descriptive convenience only and does not limit the present disclosure to the scope of the cited embodiments. It is to be understood that for a person skilled in the art, after understanding the principle of the system, it may be possible to arbitrarily combine individual modules or form a subsystem to connect with other modules without departing from this principle. In some embodiments, the depth information acquisition module, the 3D character recognition module, the workpiece information acquisition module, and the light source color determination module disclosed in FIG. 2 may be different modules in a system and may also be one module realizes the functions of two or more modules described above. For example, each module may share a storage module, and each module may have a respective storage module. Such deformations are within the scope of protection of the present disclosure.

Figure 3:
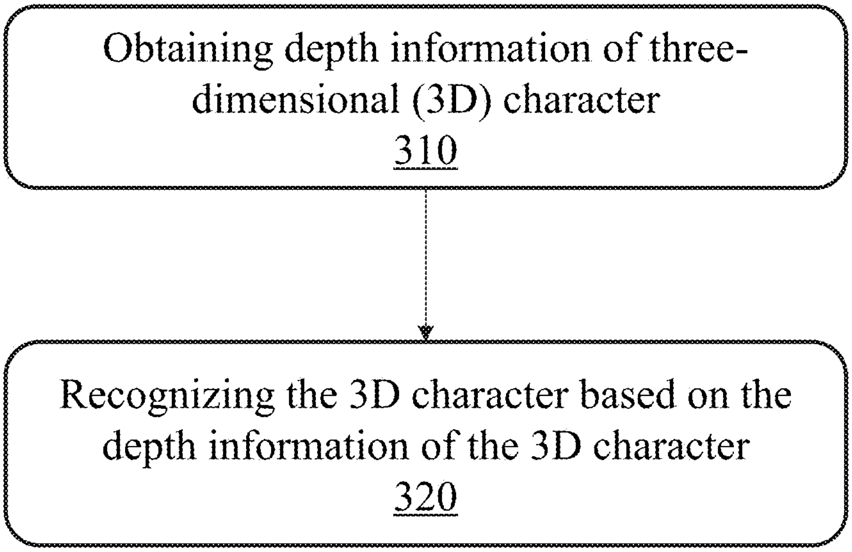
FIG. 3 is a flowchart illustrating an exemplary process for recognizing a 3D character according to some embodiments of the present disclosure.

FIG. 3 is a flowchart illustrating an exemplary process for recognizing a three-dimensional (3D) character according to some embodiments of the present disclosure.

In some embodiments, the process for recognizing a three-dimensional (3D) character 300 (referred to as process 300 hereinafter) may be performed by the system 100 (e.g., the processing device 110) or the system 200. For example, the process 300 may be stored in a storage device (e.g., the storage device 150) in a form of a program or an instruction, and when the system 100 (e.g., the processing device 110) executes the program or the instruction, the process 300 may be realized. The schematic representation of the operation of the process 300 presented below is illustrative. In some embodiments, one or more additional operations not described and/or one or more operations not discussed may be utilized to complete the process. Additionally, the order of the operations of the process 300 illustrated in FIG. 3 and described below is not intended to be limiting.

In 310, depth information of the 3D character may be obtained. In some embodiments, operation 310 may be performed by the depth information acquisition module 210.

In some embodiments, the depth information of the 3D character may be position information used to represent a position of the 3D character in a 3D space. Further, the depth information of the 3D character refers to position information of a surface of the 3D character. In some embodiments, the position information of the surface of the 3D character may include position information of a plurality of points on the surface of the 3D character.

In some embodiments, the position information may include coordinate information of the plurality of points on the surface of the 3D character in a spatial coordinate system. In some embodiments, the position information may include relative position information of the plurality of points on the surface of the 3D character with respect to a base plane where the 3D character is located. The base plane on which the 3D character is located refers to a surface from which the 3D character begins to bulge or concave, i.e., the 3D character begins to bulge upward or concave downward from the base plane. In some embodiments, the surface where the 3D character is located may be a surface where the 3D character bulges upward or concaves downward relative to the base plane. In some embodiments, the depth information of the 3D character may include point cloud data of the plurality of points on the surface of the 3D character. In some embodiments, the depth information of the 3D character may include other forms that reflect the height of the 3D character.

In some embodiments, the depth information acquisition module 210 may determine the depth information of the 3D character based on information of the 3D character acquired by the character information acquisition device 130.

In some embodiments, the information of the 3D character acquired by the character information acquisition device 130 may be the depth information of the 3D character. For example, the character information acquisition device 130 may scan spatial 3D information of the 3D character via a depth camera to obtain the position information (e.g., the point cloud data) of the surface of the 3D character. The depth information acquisition module 210 may acquire the depth information of the 3D character directly from the character information acquisition device 130.

In some embodiments, the information of the 3D character acquired by the character information acquisition device 130 may include a plurality of 2D images of the 3D character at different angles. An information processing device may perform image reconstruction based on the plurality of 2D images to determine the depth information of the 3D character (e.g., the point cloud data that represent positions of the plurality of points on the surface of the 3D character). In some embodiments, the information processing device may be part of the character information acquisition device 130. The character information acquisition device 130 may determine the depth information of the 3D character via the information processing device, and the depth information acquisition module 210 may obtain the depth information of the 3D character directly from the character information acquisition device 130. In some embodiments, the information processing device may be independent of the character information acquisition device 130, and be part of the processing device 110 (e.g., the depth information acquisition module 210). In some embodiments, the depth information acquisition module 210, after acquiring the plurality of 2D images from the character information acquisition device 130 may perform image reconstruction to determine the depth information of the 3D character. In some embodiments, an algorithm for reconstructing the depth information based on the plurality of 2D images may include a patch-based MVS (PMVS) algorithm, a marching cube (MC) algorithm, a dual contouring (DC) algorithm, or the like.

In some embodiments, the character information acquisition device 130 may include the depth camera configured to directly obtain the depth information of the 3D character. In some embodiments, the character information acquisition device 130 may include at least one flat camera to acquire the 2D image of the 3D character at different angles. In some embodiments, the character information acquisition device 130 may include at least one depth camera and/or at least one flat camera. Further descriptions regarding the at least one depth camera and/or the at least one flat camera may be found elsewhere in the present disclosure.

In 320, the 3D character may be recognized based on the depth information of the 3D character. In some embodiments, operation 320 may be performed by the 3D character recognition module 220.

In some embodiments, a recognition result of the 3D character recognition module 220 recognizing the 3D character may include a 2D image corresponding to the 3D character and/or a character meaning corresponding to the 3D character. The 2D image corresponding to the 3D character refers to a 2D image corresponding to a frontal projection (a projection to the base plane of the workpiece) of the 3D character. The character meaning corresponding to the 3D character refers to a meaning represented by the 3D character. For example, for the 3D character "Xinhua" embossed on a liquefied petroleum gas cylinder bottle, the 3D character recognized by the 3D character recognition module 220 means two Chinese characters: "新" and "华".

In some embodiments, when the recognition result includes the 2D image corresponding to the 3D character, the 3D character recognition module 220 may determine the 2D image corresponding to the 3D character based on the depth information of the 3D character. In some embodiments, the 3D character recognition module 220 may output the 2D image as the recognition result.

In some embodiments, when the recognition result include the character meaning corresponding to the 3D character, the 3D character recognition module 220 may process the depth information of the 3D character to determine the 2D image corresponding to the 3D character, and then utilize a character recognition algorithm to recognize the 2D image to determine the character meaning corresponding to the 3D character. By converting the depth information of the 3D character into the corresponding 2D image, and then recognizing the 2D image using the character recognition algorithm, the recognition accuracy of the 3D character may be greatly improved.

In some embodiments, the 3D character recognition module 220 may determine the character meaning and/or the 2D image corresponding to the 3D character directly based on the depth information of the 3D character from the predetermined algorithm. In some embodiments, the predetermined algorithm may include using a trained machine learning model.

In some embodiments, after relevant features corresponding to the depth information of the 3D character are input into a trained machine learning model, the trained machine learning model may output the character meaning of the 3D character and/or the 2D image. Taking the recognition result including the character meaning as an example, depth information of a 3D character to be recognized may be encoded as a set of vectors to be input into the machine learning model, and output data of the trained machine learning model may be the character meaning corresponding to the 3D character.

In some embodiments, a type of the trained machine learning model includes a neural network (NN), a convolutional neural network (CNN), a deep neural network (DNN), a recurrent neural network (RNN), or the like, or any combination thereof. For example, the trained machine learning model may be a model formed by combining the convolutional neural network and the deep neural network.

In some embodiments, an initial machine learning model may be trained based on a plurality of training samples to obtain the trained machine learning model. In some embodiments, the plurality of training samples may be obtained from depth information corresponding to a plurality of 3D characters. The training samples include depth information of a plurality of single characters. Label information includes a character meaning and/or a 2D image corresponding to depth information of a single character. Taking the training samples as input data and the label information as output data, the input data and the output data are input into the initial machine learning model for training to obtain the trained machine learning model.

In some embodiments, the depth information of the 3D characters may be segmented by segmenting the depth information of the 3D character to obtain the depth information of the single 3D character that is used as the training sample. Alternatively, subsequent character recognition may be performed based on the depth information of the segmented single character. In some embodiments, character segmentation may be performed by projection, and more descriptions may be found elsewhere in the present disclosure, e.g., in FIG. 5. In some embodiments, the depth information of the single character may be determined by clustering, so as to realize the segmentation and extraction of the single character, and more descriptions may be found in elsewhere in the present disclosure, e.g., in FIG. 9.

In some embodiments, the predetermined algorithm may include an algorithm other than the machine learning model algorithm. In some embodiments, the storage device 150 may pre-store reference depth information corresponding to each of the plurality of 3D characters, and reference character meanings and/or reference 2D images corresponding to the reference depth information of the plurality of 3D characters. The 3D character recognition module 220 may determine, based on a similarity between the depth information of the 3D character to be recognized and the reference depth information corresponding to the plurality of 3D characters pre-stored in the storage device 150, a character meaning and/or a 2D image corresponding to the 3D character to be recognized. For example, the 3D character recognition module 220 may determine the similarity between the reference depth information corresponding to each of the plurality of 3D character pre-stored in the storage device 150 and the depth information of the 3D character to be recognized, and obtain the reference character meaning and/or the reference 2D image of a prestored 3D character whose similarity is greater than a threshold (e.g., 90%), and use the reference character meaning and/or thew reference 2D image of the prestored 3D character as a recognition result of the 3D character to be recognized.

Figure 4:
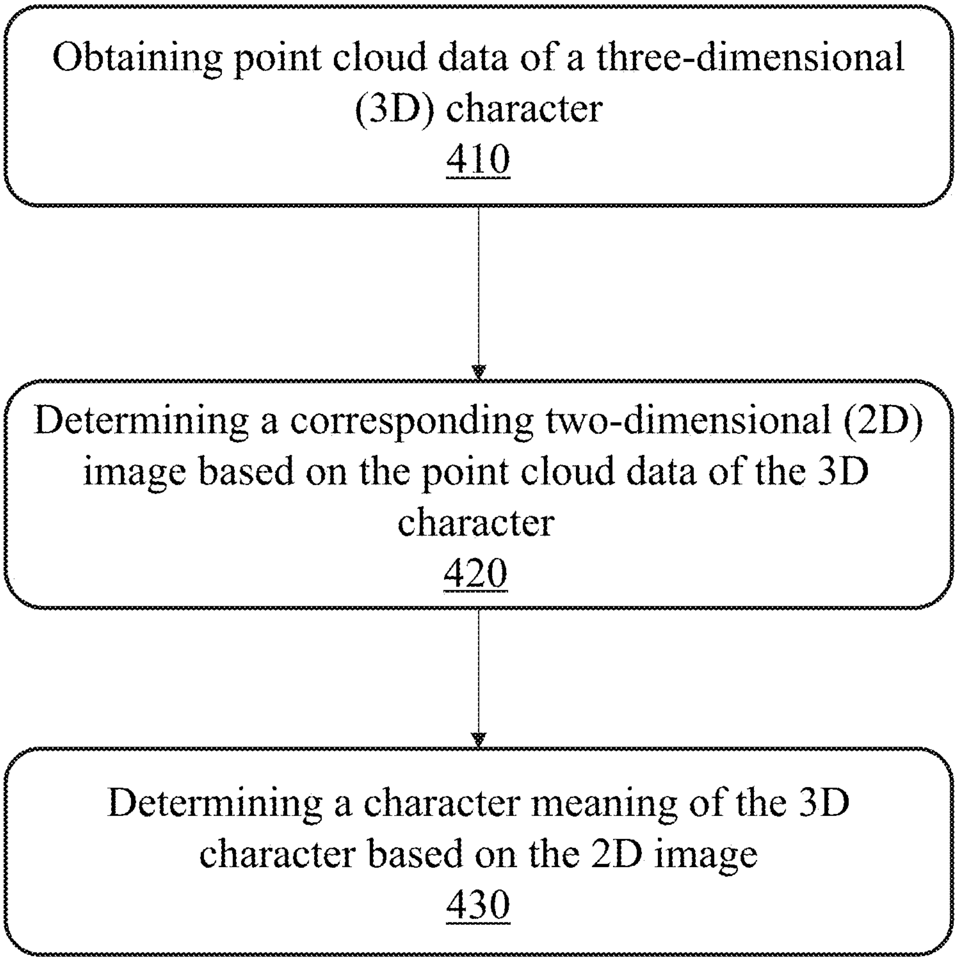
FIG. 4 is a flowchart illustrating an exemplary process for recognizing a 3D character based on point cloud data of the 3D character according to some embodiments of the present disclosure.

In some embodiments, the depth information of the 3D character in one or more embodiments of the present disclosure may include the point cloud data of the 3D character. The following describes a process of recognizing the character meaning of the 3D character in conjunction with FIG. 4, using the point cloud data as an example. Details of process 400 may be found in operations 410-430.

In 410, the point cloud data of a 3D character may be obtained. In some embodiments, operation 410 may be performed by the depth information acquisition module 210.

In some embodiments, the depth information acquisition module 210 may acquire the point cloud data of 3D character based on the character information acquisition device 130. In some embodiments, the depth information acquisition module 210 may acquire overall point cloud data of the 3D character and the surface of the workpiece where the 3D character is located. The depth information acquisition module 210 may acquire information about points on the surface of the workpiece being machined with the 3D character based on the character information acquisition device 130, to form the overall point cloud data. The overall point cloud data includes 3D point cloud data of the surface of the workpiece where the 3D character is located and the point cloud data of the 3D character. In some embodiments, the depth information acquisition module 210 may separate the 3D point cloud data of the surface of the workpiece from the point cloud data of the 3D character in the overall point cloud data to obtain the point cloud data of the 3D character.

In some embodiments, the point cloud data of the surface of the workpiece in the overall point cloud data may be determined by matching information of a 3D model (also referred to as 3D model information) of the surface of the workpiece with the overall point cloud data to determine the point cloud data of the surface of the workpiece in the overall point cloud data, thereby determining point cloud data of the 3D character that protrudes from or is recessed into the surface of the workpiece in the overall point cloud data.

In some embodiments, the depth information acquisition module 210 may obtain the 3D model information of the surface of the workpiece where the 3D character is located. The 3D model information of the surface of the workpiece where the 3D character is located may be information used to build the 3D model of the surface of the workpiece where the 3D character is located. In some embodiments, a file format of the 3D model may include one or more of OBJ format, open scene graph binary (OSGB) format, stereolithography (STL) format, or the like. In some embodiments, the 3D model information of the surface of the workpiece where the 3D character is located may include a computer aided design (CAD) three-dimensional model of the surface of the workpiece where the 3D character is located.

In some embodiments, the storage device 150 may pre-store the 3D model information of the surface of the work-piece where the 3D character is located, and the depth information acquisition module 210 may obtain, via the network 120, the 3D model information of the surface of the workpiece where the 3D character is located from the storage device 150. In other embodiments, the depth information acquisition module 210 may obtain, via the network 120, the 3D model information of the surface of the work-piece where the 3D character is located from the terminal device 140.

In some embodiments, the depth information acquisition module 210 may determine the point cloud data of the 3D character based on the overall point cloud data and the 3D model information. The depth information acquisition module 210 may determine, based on the overall point cloud data and the 3D model information, the point cloud data of the surface of the workpiece in the overall point cloud data, and determine the point cloud data of the 3D character based on the point cloud data of the surface of the workpiece and the overall point cloud data. For example, the depth information acquisition module 210 may extract the point cloud data of the surface of the workpiece from the overall point cloud data, and use the remaining point cloud data of the overall point cloud data as the point cloud data of the 3D character.

In some embodiments, the depth information acquisition module 210 may determine, based on a predetermined algorithm, point cloud data of a base plane (also referred to as base point cloud data) in the overall point cloud data that matches the 3D model information of the surface of the workpiece. The base plane point cloud data refers to the point cloud data in the overall point cloud data that reflects the surface of the workpiece. The 3D model information of the surface of the workpiece may include information of the position of a plurality of points on the surface of the workpiece (e.g., coordinates of the plurality of points that make up the surface of the workpiece). In some embodiments, the overall point cloud data may be matched with the 3D model information of the surface of the workpiece by the predetermined algorithm to determine the point cloud data that matches the 3D model information of the surface of the workpiece in the overall point cloud data, i.e., the base plane point cloud data. In some embodiments, the predetermined algorithm may include a 3D optimal matching algorithm, a least squares spatial matching algorithm, a Chebyshev algorithm, etc.

In some embodiments, the depth information acquisition module 210 may determine point cloud data having a distance from the base plane point cloud data exceeding a predetermined threshold, as the point cloud data of the 3D character. In some embodiments, the depth information acquisition module 210 may determine the predetermined threshold based on the depth information of the 3D character. The depth information of the 3D character may be a height and/or a recessed depth of the 3D character protruding with respect to the surface of the workpiece where the 3D character is located. In some embodiments, the predetermined threshold may be 10% to 40% of the depth information. In some embodiments, the predetermined threshold may be 10% to 30% of the depth information. In some embodiments, the predetermined threshold may be 10% to 20% of the depth information. In some embodiments, a value of the predetermined threshold may be within a range of 50 micrometers to 1 millimeter. In some embodiments, the value of the predetermined threshold may be within a range of 10 micrometers to 200 micrometers. In some embodiments, the value of the predetermined threshold may be within a range of 20 micrometers to 100 micrometers. In some embodiments, the value of the predetermined threshold may be within a range of 30 micrometers to 80 micrometers. In some embodiments, the depth information acquisition module 210 may directly use other point cloud data in the overall point cloud data other than the base plane point cloud data as the point cloud data of the 3D character.

In some embodiments, the depth information acquisition module 210 may convert data of the surface of the 3D character acquired by the character information acquisition device 130 to the point cloud data of the 3D character.

In some embodiments, the depth information acquisition module 210 may synthesize a 3D image of the 3D character based on the plurality of 2D images of the 3D character acquired by the character information acquisition device 130 at different angles, and convert an image coordinate system of the synthesized 3D image of the 3D character to a point cloud coordinate system, thereby obtaining the point cloud data of the 3D character. In some embodiments, the character information acquisition device 130 may acquire the point cloud data of the 3D character in other ways, as described elsewhere in the present disclosure.

In some embodiments, the 3D character recognition module 220 may determine the corresponding 2D image based on the point cloud data of the 3D character, and then determine the character meaning of the corresponding character based on the 2D image, as shown in operations 420 and 430. In some embodiments, the 3D character recognition module 220 may directly utilize a machine learning model or an algorithm other than the machine learning model to process the point cloud data of the 3D character to determine the recognition result of the 3D character. Detailed descriptions may be found in the relevant description of FIG. 6.

In 420, the corresponding 2D image may be determined based on the point cloud data of the 3D character. In some embodiments, operation 420 may be performed by the 3D character recognition module 220.

In some embodiments, projection may be used to obtain the 2D image of the point cloud data of the 3D character. In some embodiments, the point cloud data of the 3D character may be processed directly using the predetermined algorithm (e.g., a machine learning model) to determine the corresponding 2D image. More related descriptions may be found in FIG. 3.

In some embodiments, the 3D character may include at least one character. When the 3D character includes one character, the point cloud data of the 3D character may be projected to a reference base plane to determine the 2D image corresponding to the 3D character.

In some embodiments, when the 3D character includes more than two characters, the point cloud data of the 3D character may be segmented, and after segmenting the point cloud data of the 3D character into the point cloud data of a single character, the point cloud data of a plurality of single characters may then be projected to the reference base plane to determine the point cloud data of the single character corresponding to the 3D character. Exemplarily, point cloud data of a 3D character "IAB" is segmented into three parts including point cloud data of a single character "I", point cloud data of a single character "A", and point cloud data of a single character "B". As another example, for a 3D character arranged in a plurality of lines, a depth information acquisition unit may perform line segmentation on the point cloud data of the 3D character to segment the point cloud data of the 3D character into point cloud data of each line, and then segment the point cloud data of each line of the 3D character into point cloud data of a plurality of single characters. Character segmentation of the point cloud data of the 3D character, on the one hand, may make the subsequent method for recognizing the character in the 2D image simpler, and on the other hand, the obtained point cloud data of a single 3D character may be used as training samples for training the machine learning model. More related descriptions may be found in FIG. 3. Detailed descriptions regarding a specific segmentation manner may be found elsewhere in the present disclosure, e.g., in FIG. 5.

In some embodiments, when the at least one 3D character includes more than two characters, it is also possible to not perform character segmentation thereof, and the point cloud data of the unsegmented 3D character may be projected directly to the reference base plane to determine the corresponding 2D image.

In some embodiments, to improve the accuracy of the character outline of the 3D character in the 2D image, the 3D character recognition module 220 may process the point cloud data of the unsegmented 3D character to generate a plurality of added point cloud data related to the character outline of the 3D character (i.e., the added point cloud data) before projecting the point cloud data of the unsegmented 3D character to the reference base plane. The point cloud data related to the character outline of the 3D character may be the point cloud data that may reflect the character outline of the 3D character. Thus, a count of point cloud data of projection points projected to the reference base plane is increased, which increases the recognition accuracy.

In some embodiments, the 3D character recognition module 220 may process the point cloud data of the unsegmented 3D character to generate at least one initial point cloud data and determine the character outline of the 3D character based on the added point cloud data and the at least one initial point cloud data of the 3D character. The point cloud data of the 3D character refers to the point cloud data of the 3D character before generating the added point cloud data. In some embodiments, the 3D character recognition module 220 may determine, based on the added point cloud data and the point cloud data of the 3D character, corresponding projection data, and determine the character outline of the 3D character based on the projection data. In some embodiments, the obtaining of the initial point cloud data may be referred to in the relevant description of obtaining the initial point cloud data elsewhere in the present disclosure.

In some embodiments, the 3D character recognition module 220 determines adjacent point cloud data near the initial point cloud data based on the initial point cloud data and a search distance. Further, the 3D character recognition module 220 may generate the added point cloud data based on the initial point cloud data and the adjacent point cloud data. In some embodiments, the search distance (i.e., a distance threshold) may be greater than a resolution of the character information acquisition device 130. The resolution may be used to reflect a distance between two adjacent points in the point cloud data captured by the character information acquisition device 130. More descriptions regarding the distance threshold may be found in FIG. 9 and its related descriptions. More descriptions regarding determining the adjacent point cloud data may be found in FIG. 9 and its related descriptions.

In some embodiments, the added point cloud data may be generated between the initial point cloud data and the adjacent point cloud data near the initial point cloud data. More descriptions regarding generating the added point cloud data between the initial point cloud data and the adjacent point cloud data near the initial point cloud data may be found in FIG. 5 and its related descriptions.

In some embodiments, the 3D character recognition module 220 may obtain position information of two adjacent point cloud data in the point cloud data of the 3D character, and generate the added point cloud data between the two adjacent point cloud data based on the position information of the two adjacent point cloud data. In some embodiments, the 3D character recognition module 220 may obtain the position information of at least one point cloud data from the point cloud data of the unsegmented 3D character to be used as the position information of the initial point cloud data, obtain the position information of the adjacent point cloud data of the initial point cloud data, and generate the added point cloud data based on the position information of the initial point cloud data and the position information of the adjacent point cloud data. More description regarding generating the added point cloud data based on the position information of the initial point cloud data and the position information of the adjacent point cloud data may be found elsewhere in the present disclosure, such as FIG. 5 and its related descriptions.

Figure 5:
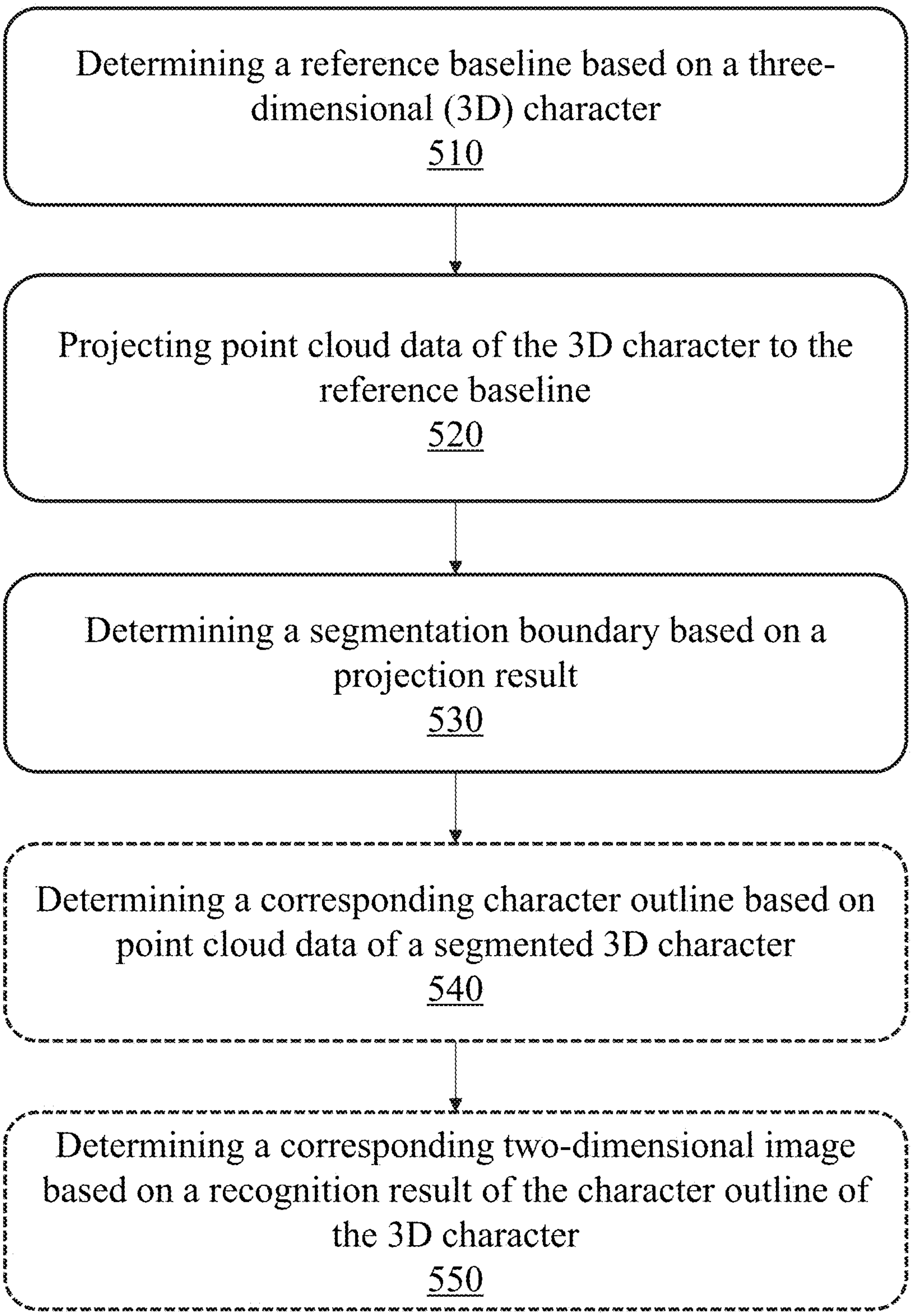
FIG. 5 is a flowchart illustrating an exemplary process for character segmentation based on point cloud data of the 3D character according to some embodiments of the present disclosure.

In some embodiments, the 3D character recognition module 220 may automatically generate added point cloud data between the initial point cloud data and the one or more adjacent point cloud data based on an interpolation algorithm. More detailed descriptions regarding automatically generating the at least one added point cloud data between the initial point cloud data and the one or more adjacent point cloud data based on the interpolation algorithm may be found in the related descriptions elsewhere in the present disclosure, for example. FIG. 5 and its related descriptions.

In some embodiments, after generating the added point cloud data based on the point cloud data of the unsegmented 3D character, the 3D character recognition module 220 may project the added point cloud data after generating the added point cloud data of the 3D character to the reference base plane to determine the corresponding 2D image.

In some embodiments, when the 3D character includes more than two characters, after segmenting the 3D character into single characters, the point cloud data of the single characters may be processed separately using the predetermined algorithm to determine the corresponding 2D image of each single character. In some embodiments, the point cloud data of the unsegmented 3D character may be processed based on the predetermined algorithm to determine the corresponding 2D image.

In 430, a character meaning of the 3D character may be determined based on the 2D image. In some embodiments, operation 430 may be performed by the 3D character recognition module 220.

In some embodiments, the 3D character recognition module 220 may determine the character meaning of the 3D character based on the 2D image corresponding to the point cloud data of the unsegmented 3D character, or may determine the character meaning of the 3D character based on the 2D image corresponding to the point cloud data of the segmented single character, or may generate the 2D images corresponding to the added point cloud data based on the point cloud data of the 3D character to determine the character meaning of the 3D character.

In some embodiments, the 3D character recognition module 220 may utilize a predetermined character recognition algorithm to recognize the 2D image corresponding to the point cloud data of the unsegmented 3D character or the point cloud data of the segmented single character to determine the character meaning of the 3D character. In some embodiments, the predetermined character recognition algorithm may include an optical character recognition (OCR) algorithm. The ORC algorithm may include a connectionist temporal classification (CTC) algorithm, a convolutional recurrent neural network (CRNN) algorithm, a connectionist text proposal network (CPTN), a connectionist text proposal network (CPTN) algorithm, a multi-label classification algorithm, etc.

In some embodiments, the 3D character recognition module 220 may recognize the text region in the 2D image according to the predetermined character recognition algorithm. If the 3D character corresponding to the 2D image is the unsegmented character, the 3D character recognition module 220 may perform a segmentation process within a text region to segment the 3D character into different single characters, and then perform character recognition on the segmented character to recognize the character meaning of the entire 3D character. If the 3D character corresponding to the 2D image is the segmented character (i.e., single character), the 3D character recognition module 220 may perform character recognition within several text regions separately to recognize the character meaning of a plurality of single characters after segmentation.

In some embodiments, the storage device 150 may prestore a plurality of character recognition templates, each of which corresponds to a standard character. The standard character includes a simplified Chinese character, a traditional Chinese character, an English letter, a number, a customized character, etc. The 3D character recognition module 220 may obtain a type and a position of each character in each character recognition template and a 2D image to be recognized; for each character recognition template, determine a plurality of matching position pairs between the character recognition template and the 2D image to be recognized according to the position of each character of the same type in the character recognition template and the 2D image to be recognized; and determine a target transformation matrix between the character recognition template and the 2D image to be recognized using a feature matching algorithm according to the plurality of matching position pairs between the character recognition template and the 2D image to be recognized; for each character recognition template, align the character recognition template and the 2D image to be recognized using the target transformation matrix corresponding to the character recognition template and determine a matching degree of a text line region between the character recognition template and the 2D image to be recognized after the alignment process; select the character recognition template with the highest matching degree as a target character recognition template of the 2D image to be recognized from the character recognition templates, and designate a standard character corresponding to the target character recognition template as a corresponding character meaning.

In some embodiments, the storage device 150 may prestore 2D images corresponding to the plurality of single characters (e.g., single numbers: 1, 2, 3, single letters of the alphabet: A, B, C, single Chinese characters: 上、中、下, etc.) and character meanings corresponding to the plurality of single characters. The 3D character recognition module 220 may determine the character meanings of the plurality of single characters based on similarities between the plurality of segmented single characters and the 2D images corresponding to the plurality of single characters pre-stored in the storage device 150. For example, the 3D character recognition module 220 may extract features of each of the 2D images corresponding to the plurality of pre-stored single characters in the storage device 150 and the features of each of the 2D images corresponding to the single characters of the 3D character to be recognized, determine a feature similarity between features of each of the 2D images corresponding to the plurality of pre-stored single characters in the storage device 150 and the features of each of the 2D images corresponding to the single characters of the 3D character to be recognized, and obtain the character meaning of a pre-stored single characters whose feature similarity is greater than a threshold value (e.g., 90%), and designate the character meaning of the pre-stored single character as the character meaning of the single character to be recognized.

In some embodiments, the 3D character recognition module 220 may separately recognize the 2D images corresponding to the point cloud data of the plurality of single characters according to a predetermined recognition rule, determine the character meanings of the plurality of single characters after segmentation, and then determine the character meaning of the 3D character according to the character meanings of the plurality of single characters. The predetermined recognition rule may be an order in which the 3D character recognition module 220 recognizes the 2D image corresponding to the point cloud data of the plurality of single characters. For example, the order may include left to right, right to left, etc.

The 3D character recognition module 220 may combine the character meanings of the plurality of single characters based on a predetermined combination rule to determine the character meaning of the 3D character. In some embodiments, the predetermined recognition rule may be consistent with the predetermined combination rule. For example, the 3D character recognition module 220 may, after separately recognizing the 2D image corresponding to the point cloud data of the plurality of single characters according to the order from left to right, arrange the character meanings of the plurality of single characters according to the order from left to right, and obtain the character meaning of the 3D character.

In some embodiments, the predetermined recognition rule may not be consistent with the predetermined combination rule. In some embodiments, the 3D character recognition module 220 may recognize the 2D images corresponding to the segmented plurality of single characters according to a random rule to determine the character meanings of the plurality of single characters. However, in combining the character meanings of the plurality of single characters, the combination may be made with reference to the position of the single characters in the overall 3D character before the character meanings of the plurality of single characters are recognized. For example, the 3D character recognition module 220 may perform a combination of the three single characters "A", "b", and "c" corresponding to the 2D image for character meaning recognition, and the recognition results are respectively the English uppercase letter "A", the English lowercase letter "b" and the English lowercase letter "c". The character recognition results are arranged according to a corresponding positional order based on a positional order of the three single characters before recognizing the character meanings to obtain the character meaning of the entire 3D character "Abc".

FIG. 5 is a flowchart illustrating an exemplary process for character segmentation based on point cloud data of a 3D character according to some embodiments of the present disclosure. In some embodiments, the 3D character may be segmented based on projection results of a plurality of points in the point cloud data of the 3D character. For specific descriptions of process 500, please refer to operations 510-530.

In 510, a reference baseline may be determined based on the 3D character. In some embodiments, operation 510 may be performed by the character segmentation unit 221.

The reference baseline may be a straight line used to carry a distribution of the point cloud data of the 3D character. The character segmentation unit 221 may project the point cloud data of the 3D character to the reference baseline to determine the distribution of the 3D character and then determine a segmentation boundary of the 3D character based on the distribution.

Figure 7:
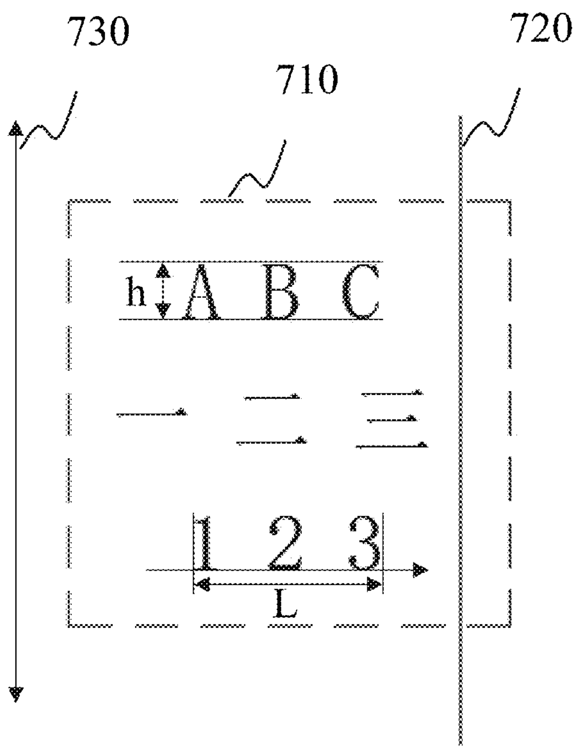
FIG. 7 is a schematic diagram illustrating determining a single line reference baseline according to some embodiments of the present disclosure.

In some embodiments, a plurality of single characters in the 3D character are distributed on the same line. For example, the 3D character 810 shown in FIG. 8 includes “ABC” arranged in a line. In some embodiments, the plurality of characters of the 3D character are distributed over two or more lines. For example, the 3D character 710 in FIG. 7 includes a plurality of characters arranged in three lines, with a first line being “ABC”, a second line “one, two, three”, and the third line being “123”.

When two or more lines are included in the 3D character, single line segmentation may be first performed to determine a segmented single line character. Then single character segmentation may be performed separately on the 3D character in each line to determine the single character in each line. When the 3D character includes only one line of characters, the single character segmentation may be directly performed in this line.

The single line segmentation may include projecting point cloud data of a plurality of lines of characters to a first reference baseline to obtain a projection result and determining a segmentation boundary between two lines according to the projection result, i.e., the 3D character is segmented into several single lines. The first reference baseline may also be referred to as a single line reference baseline. The single character segmentation may include projecting the point cloud data of a plurality of characters in the same line to a second reference baseline to obtain a projection result and determining a segmentation boundary between two characters according to the projection result, i.e., the 3D character in the same line is segmented into a plurality of single characters. The second reference baseline may also be referred to as a single character reference baseline.

In some embodiments, the character segmentation unit 221 may determine a single line reference baseline and a single character reference baseline based on a height direction of the 3D character. A height of the 3D character refers to a vertical distance from a vertex of the character to a bottom surface of the character from a frontal viewpoint (a frontal projected viewpoint). For example, the height of the 3D character 710 is the height h of “ABC” in 3D character 710 in FIG. 7.

In some embodiments, for a 3D character including two or more lines, the character segmentation unit 221 may designate a straight line that is parallel or approximately parallel to the height direction of the 3D character as the single line reference baseline. For example, a straight line that passes through a point in the point cloud data of the 3D character and is parallel to the height direction of the 3D character is designated as the single line reference baseline. Approximately parallel means that an angle between the single line reference baseline and the height direction of the 3D character is within a range of 170°-180°.

In some embodiments, approximately parallel may mean that the angle between the single line reference baseline and the height direction of the 3D character is within a range of 175°-180°. Exemplarily, with reference to FIG. 7, for a three-line character including characters “123”, “ABC” and “一二三”, the character segmentation unit 221 may determine a straight line 720 parallel to the height direction 730 of the 3D character as the single line reference baseline.

In some embodiments, the single line reference baseline 720 may be located in a far right side of the length (e.g., a character length L of the 3D character “123” in FIG. 7) direction of the 3D character, may be located in the middle region of the length direction, may be located in a far left side of the length direction of the 3D character, or the like.

In some embodiments, for a single line of the 3D character including two or more characters, the character segmentation unit 221 may designate a straight line that is parallel, or approximately parallel to the length direction of the single line of the 3D character as the single character reference baseline. Exemplarily, in conjunction with FIG. 8, the character segmentation unit 221 may designate a straight line that is located above the single line of the 3D character 810 and parallel to the length direction 830 of the single line of the 3D character 810 as the single character reference baseline. Exemplarily, the single character reference baseline 820 may pass through, in turn, the three single characters “A”, “B”, and “C” that includes the 3D character 810. In some embodiments, a center plane of the 3D character 810 in the height direction may be determined as the single character reference baseline 820. For example, the single character reference baseline 820 may be a straight line located on the center plane in the height direction that is parallel to the length direction of the character. The center plane of the height direction may be a plane that is perpendicular to the height direction and passes through a midpoint of the highest and lowest points of the 3D character 810 in the height direction.

Further, the single character reference baseline may be determined based on midlines of the 3D character in the height direction and the thickness direction. The midline in the height direction and the thickness direction may be a straight line determined by an intersection in the center plane of the height direction with the center plane of the thickness direction. The thickness direction refers to a direction in which the 3D character is recessed or protruded from a base plane. The center plane of the thickness direction may be a plane that is perpendicular to the thickness direction and passes through the midpoint of the highest and lowest points of the 3D character in the thickness direction. In some embodiments, the single character reference baseline may be a straight line coinciding with the midline or may be a straight line within a range of a predetermined distance from the 3D character in the height direction on the midline.

A line where single characters are arranged in one or more embodiments of the present disclosure may be a straight line (e.g., the base plane on which the plurality of 3D characters are located is a plane) or a curve (e.g., the base plane on which the plurality of 3D characters are located is a curved surface). Correspondingly, in some embodiments, the reference baseline may be a straight line, a curve, or a polyline.

In 520, the point cloud data of the 3D character may be projected to the reference baseline. In some embodiments, operation 520 may be performed by the character segmentation unit 221.

After the reference baseline is determined in operation 510, the point cloud data of the 3D character may be projected to the reference baseline. In some embodiments, the character segmentation unit 221 may determine a projection direction, and then project the point cloud data of the 3D character to the reference baseline (the single line reference baseline or the single character reference baseline) along the projection direction. In some embodiments, the projection direction may be at a predetermined angle to the reference baseline (the single line reference baseline or the single character reference baseline). In some embodiments, the predetermined angle may be any value in a range of 45°-90°. In some embodiments, the predetermined angle may be any value in a range of 60°-90°. In some embodiments, the predetermined angle may be any value in a range of 75°-90°. Preferably, the predetermined angle is 90°, i.e., the projection direction is perpendicular to the reference baseline. In some embodiments, the projection direction may be aligned with an inclination degree of the 3D character in the height direction. For example, if the 3D character is not tilted in the height direction, the projection direction may be 90°. As another example, if the 3D character is tilted 30° to the right in the height direction, the projection direction may be 60°.

In some embodiments, after the reference baseline and the projection direction are determined, the entirety of the point cloud data of the 3D character may be projected to the reference baseline, or a portion of the point cloud data of the 3D character may be projected to the reference baseline. In some embodiments, the point cloud data passing over a plane where the reference baseline is located may be projected to the reference baseline. The plane where the reference baseline is located may include a plane that is perpendicular to the thickness direction or the length direction of the 3D character. In some embodiments, the character segmentation unit 221 may determine a plane (e.g., a two-dimensional plane) that passes through the single character reference baseline and is perpendicular to the thickness direction of the 3D character based on the single character reference baseline, and designate the point cloud data on the plane as the point cloud data to be projected. In some embodiments, the character segmentation unit 221 may determine a plane (e.g., a two-dimensional plane) that passes through the single line character reference baseline and is perpendicular to the length direction of the 3D character based on the single line character reference baseline and designate the point cloud data on the plane as the point cloud data to be projected.

In 530, a segmentation boundary may be determined based on the projection result. In some embodiments, operation 530 may be performed by the character segmentation unit 221.

The segmentation boundary refers to a boundary that may distinguish the 3D character from line to line or character to character. The segmentation boundary between lines or between characters may be determined based on the projection result of the point cloud data of the 3D character projected to the reference baseline. In some embodiments, the segmentation boundary may be determined based on a distribution of points on the reference baseline after the point cloud data of the 3D characters is projected to the reference baseline. In some embodiments, the distribution of points may include a distribution of a plurality of projection points.

In the distribution of projection points on the reference baseline, an area in a projection region of the reference baseline corresponding to the point cloud data of the 3D character may include a plurality of projection points, and an area in the projection region of the reference baseline corresponding to a gap region between two adjacent 3D single characters or between two lines of characters may include fewer or no projection points. In some embodiments, the segmentation boundary may be determined based on a region where fewer projection points are distributed in the projection result.

In some embodiments, in the projection result of the reference baseline, along the direction of the reference baseline, a region where a count of projection points is less than a predetermined threshold may be designated as a segmentation region. In some embodiments, the predetermined threshold of the count of projection points may be within a range of 1-50. In some embodiments, the predetermined threshold of the count of projection points may be within a range of 5-30. In some embodiments, the predetermined threshold of the count of projection points may be within a range of 10-20.

In some embodiments, in the distribution of the plurality of projection points on the reference baseline, a region where a change value in the count of projection points is greater than a predetermined difference may be designated as the segmentation region. That is to say, the region where the count of projection points decreases drastically may be designated as the segmentation region. The predetermined difference may be a value of the reduction or a percentage of the reduction in the count of projection points in adjacent regions.

In some embodiments, the segmentation region may be a point or a range (a range on the reference baseline may be considered as a line segment). If the segmentation region is a point, a line passing through the point and perpendicular to the reference baseline may be designated as the segmentation boundary. If the segmentation region is a range, a line passing through any point in the range and perpendicular to the reference baseline may be designated as the segmentation boundary. Preferably, the segmentation boundary may pass through a center of the range (e.g., a midpoint of the segmentation region along a direction parallel to the reference baseline).

Figure 8:
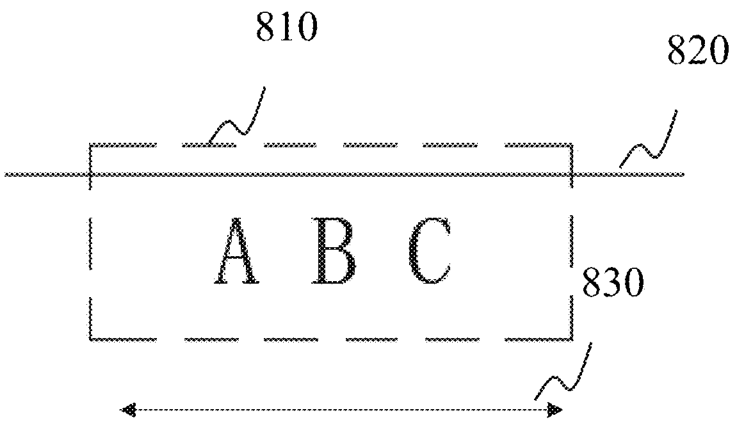
FIG. 8 is a schematic diagram illustrating determining a reference baseline of a single character according to some embodiments of the present disclosure.

Take FIG. 8 as an example, in the projection result of the point cloud data of the 3D character "ABC" in FIG. 8 projected to the single character reference baseline 820, there is a region without projection points between the characters "A" and "B". The count of projection points in the region is less than the predetermined threshold of 50, then the region may be determined to be the segmentation region, and a straight line that passes through a midpoint of the region (a certain section of the region on the reference baseline may be regarded as a line segment) and is perpendicular to the length direction of the character may be designated as the segmentation boundary. For segmenting the plurality of lines of the 3D character in FIG. 5, the segmentation boundary between adjacent lines may be determined according to the projection result on the single line reference baseline and then each line of the segmented 3D character may be segmented into single characters according to the manner described in FIG. 5.

In some embodiments, the 3D character recognition module 220 may recognize the 3D character based on the segmentation result of the 3D character by the character segmentation unit 221. In some embodiments, the segmentation result of the 3D character by the character segmentation unit 221 may be used for machine learning model training, and a trained machine learning model may be used to recognize depth information (e.g., the point cloud data) of the 3D character. More descriptions may be found in FIG. 3 and related descriptions thereof. In some embodiments, the segmentation result of the 3D character may be subsequently processed. For example, a corresponding character outline may be determined based on the segmentation result of the 3D character by the character segmentation unit 221, i.e., operation 540. As another example, the corresponding 2D image may be further obtained based on the character outline, i.e., operation 550.

In 540, a corresponding character outline may be determined based on the point cloud data of the segmented 3D character. In some embodiments, operation 540 may be performed by the character search unit 222. In some embodiments, the character outline may be an edge outline of a character within a certain projection plane (e.g., an orthographic projection plane) of a 3D character. In some embodiments, the character outline refers to an edge outline of the 3D character within an orthographic projection plane. In some embodiments, the character search unit 222 may generate a corresponding character outline based on the point cloud data of the segmented 3D character.

In some embodiments, to improve the accuracy of the generated character outline of the single character, the character search unit 222 may process the point cloud data of the segmented single character to generate added point cloud data related to the character outline of the single character (i.e., the added point cloud data) before projecting the point cloud data of the single character. The added point cloud data related to the character outline may be the point cloud data that may reflect the character outline of the character. Thus, the quantity of point cloud data of the projection points projected to a 2D plane is increased, which increases the recognition accuracy.

In some embodiments, the character search unit 222 may obtain initial point cloud data from the point cloud data of the segmented single character and determine adjacent initial point cloud data near the initial point cloud data based on the initial point cloud data and a search distance. Further, the character search unit 222 may generate the added point cloud data based on the initial point cloud data and the adjacent point cloud data.

In some embodiments, the added point cloud data may be generated between the initial point cloud data and the adjacent point cloud data near the initial point cloud data. In some embodiments, one or more connecting lines may be generated between the initial point cloud data and the adjacent point cloud data near the initial point cloud data. Added point cloud data may be generated on each line. The one or more added point cloud data may be at any position on the line, for example, in the middle of the line. If there is a plurality of added point cloud data, the plurality of added point cloud data may be evenly distributed across the line. In some embodiments, the line may be a straight line or a curve. For example, for initial point cloud data A and adjacent point cloud data B of the initial point cloud data A, the character search unit 222 determines a connecting line (straight line or curve) between the initial point cloud data A and the adjacent point cloud data B. The character search unit 222 may generate added point cloud data C between the point cloud data A and the point cloud data B, and the added point cloud data C is a center point of the connecting line.

In some embodiments, the character search unit 222 may obtain position information of two adjacent point cloud data in the point cloud data of the segmented single character and generate the added point cloud data between the two adjacent point cloud data based on the position information of the two adjacent point cloud data. In some embodiments, the character search unit 222 may obtain the position information of the initial point cloud data and the position information of the adjacent point cloud data near the initial point cloud data, and generate the added point cloud data between two adjacent point cloud data based on the position information of the initial point cloud data and the position information of the adjacent point cloud data near the initial point cloud data. In some embodiments, the position information of the initial point cloud data may be represented by coordinates, and the position information of the adjacent point cloud data near the initial point cloud data may be represented by coordinates. In some embodiments, the character search unit 222 may establish a 3D Cartesian coordinate system with the character information acquisition device 130 as a coordinate center and determine the coordinates of the initial point cloud data and the position information of the adjacent point cloud data near the initial point cloud data in the 3D Cartesian coordinate system. In some embodiments, the character search unit 222 may generate the added point cloud data based on the coordinates of the initial point cloud data and the coordinates of one adjacent point cloud data near the initial point cloud data. For example, for initial point cloud data A, and first adjacent point cloud data B of the initial point cloud data A, the character search unit 222 may generate added point cloud data C between the point cloud data A and the point cloud data B. Spatial information of the point cloud data C may be generated based on spatial information of the point cloud data A and the point cloud data B. Exemplarily, if the point cloud data A has the coordinates (2, 2, 2), and the point cloud data A has the coordinates (4, 4, 4), then the character search unit 222 may generate point cloud data C with coordinates (3, 3, 3) as the added point cloud data.

In some embodiments, the added point cloud data may be automatically generated by an interpolation algorithm between the initial point cloud data and the one or more adjacent point cloud data. In some embodiments, the character search unit 222 may generate the added point cloud data between two adjacent point cloud data in the initial point cloud data and the adjacent point cloud data based on the interpolation algorithm. The interpolation algorithm may include but is not limited to, a nearest-neighbor interpolation algorithm, a bilinear interpolation algorithm, a bicubic interpolation algorithm, an edge-directed interpolation algorithm, or the like.

In some embodiments, after generating the added point cloud data between the initial point cloud data and the adjacent point cloud data near the initial point cloud data, a similar manner may be utilized to generate the added point cloud data between the adjacent point cloud data and the other adjacent point cloud data thereof. Eventually, the point cloud data may be generated between each two adjacent point cloud data in the point cloud data of the single 3D character. In some embodiments, the adjacent point cloud data may be determined based on the initial point cloud data and the distance threshold, and then the added point cloud data may be generated between the initial point cloud data and the adjacent point cloud data utilizing the foregoing manner.

In some embodiments, the distance threshold may be determined based on relevant parameters of the character information acquisition device. In some embodiments, the parameter information of the character information acquisition device 130 may include a resolution of a camera device, and the resolution may be used to reflect a distance between two adjacent data points (i.e., adjacent point cloud data) in the point cloud data acquired by the character information acquisition device 130. In some embodiments, the character search unit 222 may determine the distance threshold as a value greater than the resolution of the character information acquisition device 130. For example, if the resolution of the character information acquisition device 130 is 23 micrometers, the character search unit 222 may determine the distance threshold to be 27 micrometers. More descriptions regarding the distance threshold may be found elsewhere in the present disclosure (e.g., FIG. 9). More descriptions regarding the adjacent point cloud data may be found in descriptions regarding the "relevance point cloud data" in FIG. 9.

By generating the added point cloud data related to the character outline of the single character, the character outline is made more coherent in a projected 2D image, which improves the accuracy of 3D character recognition.

In some embodiments, the character search unit 222 may determine a corresponding character outline based on the point cloud data of the segmented single character by coordinate conversion. For example, the character search unit 222 may designate the position of the character information acquisition device 130 as the coordinate center to establish a 3D Cartesian coordinate system, calibrate Cartesian coordinates of each point in the point cloud data of the segmented single character. The character search unit 222 may designate the position of the character information acquisition device 130 as the coordinate center to establish a 3D cylindrical coordinate system, establish a conversion relationship between the Cartesian coordinates and cylindrical coordinates of each point in the 3D point cloud data to transform the 3D point cloud data from the Cartesian coordinate system to the cylindrical coordinate system. Then, the character search unit 222 may unfold a cylindrical plane of the 3D cylindrical coordinate system to construct a 2D cylindrical plane coordinate system, establish a conversion relationship between 3D cylindrical coordinates and cylindrical coordinates of the 2D cylindrical plane coordinate system of each point in the point cloud data of the segmented single character to transform the point cloud data in the cylindrical coordinate system to the 2D cylindrical plane coordinate system, generate 2D pixel coordinates of the segmented 3D character, and determine the corresponding character outline according to the 2D pixel coordinates of each point of the single character.

In some embodiments, the character search unit 222 may determine the corresponding character outline based on the point cloud data of the segmented 3D character through other manners. For example, the character search unit 222 may determine the character outline of the segmented 3D character by projection, which may be found in FIG. 6 and its related description.

In 550, the corresponding 2D image may be determined based on a recognition result of the character outline of the 3D character. In some embodiments, operation 550 may be performed by the 2D image determination unit 223.

In some embodiments, the 2D image determination unit 223 may determine the corresponding 2D image based on the character outline of the single character and determine the 2D image corresponding to the single character based on the character outline of the single character. In some embodiments, the 2D image corresponding to the 3D character in each line may involve a color including a character color and a background color. In some embodiments, the character color may be black and the background color may be white, or the background color may be black and the character color may be white. In some embodiments, the character color may be red and the background color may be blue, or the character color may be blue and the background color may be red. In some embodiments, to highlight the characters or to facilitate character meaning recognition of the characters within a determined 2D image, a color difference between the character color and the background color may be greater than 50%. In some embodiments, the color difference between the character color and the background color may be greater than 70%. The color difference between the character color and the background color may be greater than 80%. The color difference between the character color and the background color may be greater than 90%. The color difference between the character color and the background color may be greater than 99%. The color difference between the character color and the background color may be a difference between an RGB value corresponding to the character color and an RGB value corresponding to the background color. The color difference between the character color and the background color may be greater than a certain value, which may be a ratio of the difference between the RGB value corresponding to the character color and the background color to the maximum RGB value in the color system may be greater than that value. For example, the color difference between the character color and the background color being greater than 90% means that the ratio of the difference between the RGB value corresponding to the character color and the RGB value corresponding to the background color to the maximum RGB value may be greater than 90%.

In some embodiments, the 2D image may be a binarized image. In some embodiments, the 2D image determination unit 223 may, in the 2D image, mark a point corresponding to the character outline of 3D character as 0; and mark a point corresponding to a background other than the 3D character as 1. In other embodiments, the 2D image determination unit 223 may, in the 2D image, mark the point corresponding to the character outline of the 3D character as 1; and mark the point corresponding to the background other than the 3D character as 0.

Figure 6:
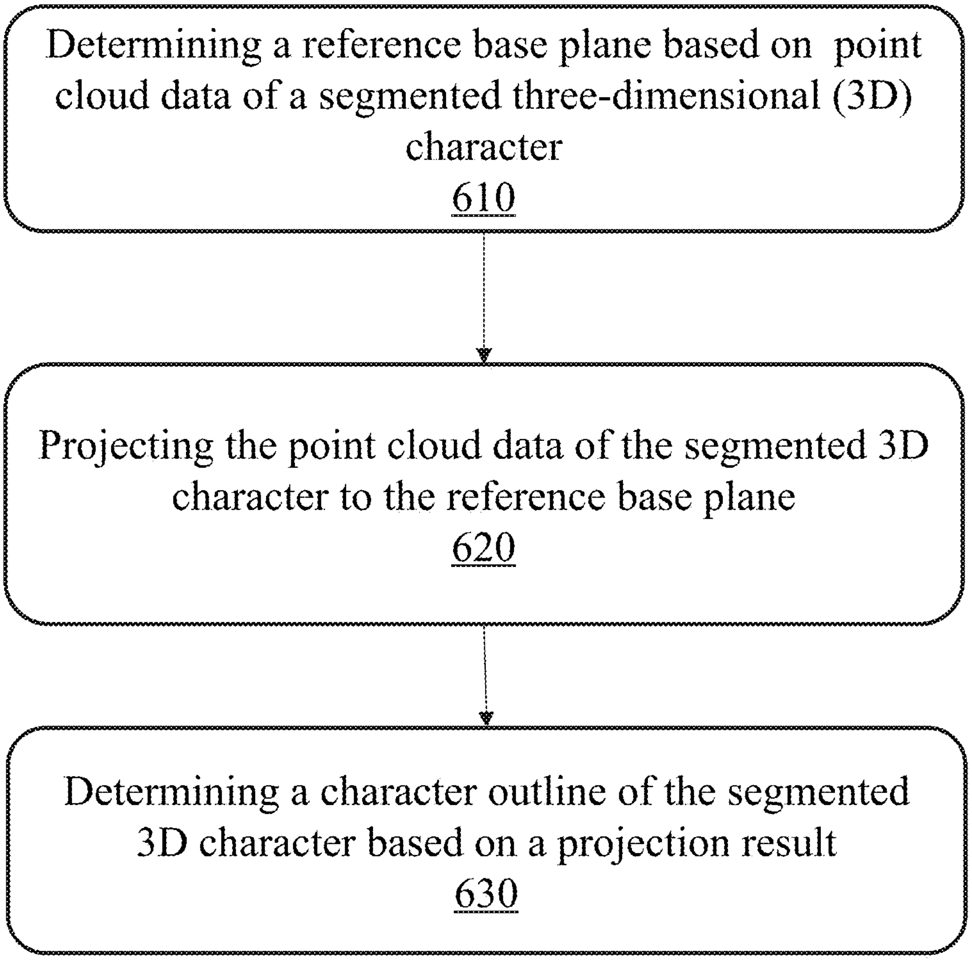
FIG. 6 is a flowchart illustrating an exemplary process for determining a corresponding character outline based on point cloud data of a segmented 3D character according to some embodiments of the present disclosure.

In some embodiments, the 2D image determination unit 223 may not perform operations 540 and 550, and generate the 2D image corresponding to the character outline of the single character based directly on the point cloud data of the character outline of the segmented single character. More descriptions regarding generating the 2D image corresponding to the character outline of the single character directly based on the point cloud data of the character outline of the segmented single character may be found elsewhere in the present disclosure (e.g., FIG. 4 and its related descriptions). In some embodiments, the character outline may be determined by determining a reference base plane, as shown in FIG. 6. For specific descriptions of process 600, see operations 610-630.

In 610, the reference base plane may be determined based on the point cloud data of the segmented 3D character. In some embodiments, operation 610 may be performed by the character search unit 222.

The reference base plane may be a plane used to host a distribution of the point cloud data of the segmented 3D character (e.g., a single line character or a single character). The character search unit 222 may project the segmented 3D character (e.g., a single line character or a single character) to the reference base plane to determine a character outline of the segmented 3D character (e.g., the single line character or the single character).

In some embodiments, the character search unit 222 may determine the reference base plane based on the point cloud data of the 3D character (e.g., the single line character or the single character) after being segmented by the character segmentation unit 221, project the point cloud data of the segmented 3D character (e.g., the single line character or the single character) to the reference base plane to obtain a projection result, and determine the character outline of the segmented 3D character (e.g., the single line character or the single character) based on the projection result. In some embodiments, the reference base plane may be determined based on the thickness direction of the 3D character. In some embodiments, the reference base plane may be any plane that is perpendicular or approximately perpendicular to the thickness direction of the segmented 3D character (e.g., the single line characters or the single character). The thickness direction of the segmented 3D character (e.g., the single line characters or the single character) refers to a direction in which the 3D character is recessed or protruded. Approximately vertical means that an angle between the reference base plane and the thickness direction of the segmented 3D character (e.g., the single line character or the single character) is within a range of 85°-90°. For example, the reference base plane may be a plane perpendicular to the thickness direction of a single character located above the segmented 3D character (e.g., the single line character or the single character). As another example, the reference base plane may be a plane disposed below the segmented 3D character (e.g., the single line character or the single character) at an angle of 87° from the thickness direction of the segmented 3D character (e.g., the single line character or the single character).

In some embodiments, to make the character outline obtained after projecting the segmented 3D character (e.g., the single line character or the single character) closer to an actual outline of the segmented 3D character (e.g., the single line character or the single character) after segmentation, the reference base plane may be determined based on a predetermined algorithm. Exemplarily, the reference base plane may be determined based on the predetermined algorithm and the point cloud data of the segmented 3D character. In some embodiments, the reference base plane may be a plane such that a sum of distances (or a sum of squares of the distances) from a plurality of point cloud data of the segmented 3D character (e.g., the single line character or the single character) to the plane is minimized. In some embodiments, the predetermined algorithm may include, but is not limited to a least square algorithm or a Chebyshev algorithm.

In 620, the point cloud data of the segmented 3D character may be projected to the reference base plane. In some embodiments, operation 620 may be performed by the character search unit 222.

After the reference base plane is determined in operation 610, the point cloud data of the segmented 3D character (e.g., the single line character or the single character) may be projected to the reference base plane. In some embodiments, the character search unit 222 may determine a projection direction, and then project the point cloud data of the segmented 3D character (e.g., the single line character or the single character) along the projection direction to the reference base plane. In some embodiments, the projection direction may be at a predetermined angle to the reference base plane. In some embodiments, the predetermined angle may be any value in a range of 45°-90°. In some embodiments, the predetermined angle may be any value in a range of 60°-90°. In some embodiments, the predetermined angle may be any value in a range of 75°-90°. Preferably, the predetermined angle is 90°, i.e., the projection direction is perpendicular to the reference base plane.

In some embodiments, after the reference base plane and the projection direction are determined, all or a portion of the point cloud data of the segmented 3D character (e.g., the single line character or the single character) may be projected to the reference base plane. In some embodiments, the character search unit 222 may determine the point cloud data projected to a reference plane based on the reference base plane. For example, the character search unit 222 may determine a plane that is parallel to the reference base plane and passes through the segmented 3D character (e.g., the single line character or the single character), and the character search unit 222 may use the point cloud data on the plane as the point cloud data projected to the reference plane.

In 630, the character outline of the segmented 3D character may be determined based on the projection result. In some embodiments, operation 630 may be performed by the character search unit 222.

The character outline of the segmented 3D character is an edge outline of the segmented 3D character in a certain projection plane (e.g., an orthographic projection plane) of the segmented 3D character (e.g., the single line character or the single character) after segmentation. In some embodiments, the character outline of the segmented 3D character (e.g., the single line character or the single character) is an edge outline of the segmented single line character or the single character within the orthographic projection plane.

In some embodiments, the character search unit 222 may determine the character outline based on a distribution of a count of projection points in the projection result on the reference base plane. In some embodiments, an edge of the character may be determined based on the variation in the count of projection points to determine the character outline. In some embodiments, if the variation in the count of projection points in a region exceeds a predetermined variation threshold, the region may be determined to be an edge region, and the edge region includes the character outline.

In some embodiments, the character search unit 222 may divide the reference base plane into a plurality of regions, determine the count of projection points in each region, designate the region containing a plurality of projection points less than a threshold (e.g., 5) as the edge region, and designate a projection point within the edge region as a target outline point. The character search unit 222 may form the character outline of the segmented 3D character (e.g., the single line character or the single character) after segmentation.

In some embodiments, it is also possible to not segment the point cloud data of the 3D character, project point cloud data of an unsegmented 3D character to the reference base plane, and determine a 2D plane corresponding to the 3D character based on the reference base plane. Subsequently, in a process of character recognition using a character recognition algorithm, characters in the 2D plane may be recognized using the character recognition algorithm. In some embodiments, it is also possible to perform a line segmentation of the point cloud data of the 3D character, i.e., segmenting the 3D character into a plurality of lines, and then project the point cloud data of the characters in each segmented lines to the 2D plane. When using the character recognition algorithm for character recognition subsequently, there is no need for line segmentation, only single characters within a single line may be segmented.

It should be noted that the foregoing descriptions of the relevant processes (e.g., process 600, process 500, and process 400) are intended to be exemplary and illustrative only and do not limit the scope of the present disclosure. For those skilled in the art, various corrections and changes to the process may be made under the guidance of the present disclosure. However, these corrections and changes remain within the scope of the present disclosure. For example, it is possible to combine two or more of the operations in the process.

In some embodiments, a plurality of light sources in the character information acquisition device 130 may be uniformly distributed around a workpiece to be measured and a camera in the character information acquisition device 130 may be located above an embossed character. Exemplarily, in an example of acquiring a plurality of 2D images, a plurality of 2D images of the 3D character at different angles are obtained based on the plurality of light sources uniformly distributed around the workpiece to be measured. For example, six light sources are arranged at equal intervals on the same circle above an irradiation region, and a flat camera is arranged above a center of the circle. Starting from any one of the light sources, the light source is illuminated to irradiate the 3D character located in the irradiation region. The character acquisition device 130 captures an image of the 3D character in the irradiation region, then lights the next light source clockwise and turns off the previous light source, and the flat camera captures the image of the 3D character in the irradiation region. Then the steps of lighting the next light source clockwise are repeated, and the process of lighting the next light source clockwise and turning off the previous light source, and the flat camera capturing the image of the 3D character in the irradiation region is repeated until all the light sources have been lit, the acquisition of the plurality of 2D images of the 3D character at different angles is completed.

In some embodiments, the character information acquisition device 130 may scan a surface of the workpiece containing the 3D character to obtain overall point cloud data. In some embodiments, the light source of the character information acquisition device 130 may include a line laser configured to emit structured lights in a shape of a straight line vertically projected to the surface of the workpiece containing the 3D character. The camera device of the character information acquisition device 130 may include a charge coupled device (CCD) camera, with 30°~40° between the line laser and the CCD camera, so that a line structured light from the pre-calibrated line laser and the CCD camera may synchronously scan on the surface of the workpiece containing the 3D character (e.g., the line laser and the CCD camera are arranged on the same rotary table and the rotation of the rotary table is controlled so that the line structured light from the line laser and the CCD camera may synchronously scan on the surface of the workpiece containing the 3D character), and the overall point cloud data containing the point cloud data of the 3D character may be obtained.

In some embodiments, the character information acquisition device 130 may include a stereo camera configured to acquire at least two raw images of the surface of the workpiece where the 3D character is located and one of the two raw images may be used as a primary image, the other one of the two raw images may be used as a secondary image. The character information acquisition device 130 may determine a parallax based on pixel points having a correspondence between the primary image and the secondary image by a specific algorithm (e.g., a semi-global-block matching (SGBM) algorithm, a block matching (BM) algorithm), and then determine a parallax-to-depth value conversion equation (e.g., depth=(f*baseline)/disp, where depth denotes the depth value; f denotes a normalized focal length; the baseline is a distance between optical centers of the two cameras of the stereo camera; and disp is the parallax value) based on a geometric relationship of parallel binocular vision. Then, the parallax may be converted to the depth value of the corresponding pixel point based on the conversion equation. Finally, the overall point cloud data may be determined based on the primary image, the secondary image, and the depth value of the corresponding pixel point.

In some embodiments, the character information acquisition device may further include a line laser profiler. The line laser profiler may be triggered to perform measurements at certain intervals to acquire a 3D scanning profile curve for each scan. The line laser profiler may scan a surface of the 3D character continuously, and acquire the currently scanned 3D outline data. For each outline curve, a fitted polynomial curve model may be established and solved, and the fitted polynomial outline curve may be outputted. In some embodiments, the character information acquisition device 130 may include other 3D information acquisition devices, such as a white light interferometer or a confocal microscope.

Figure 9:
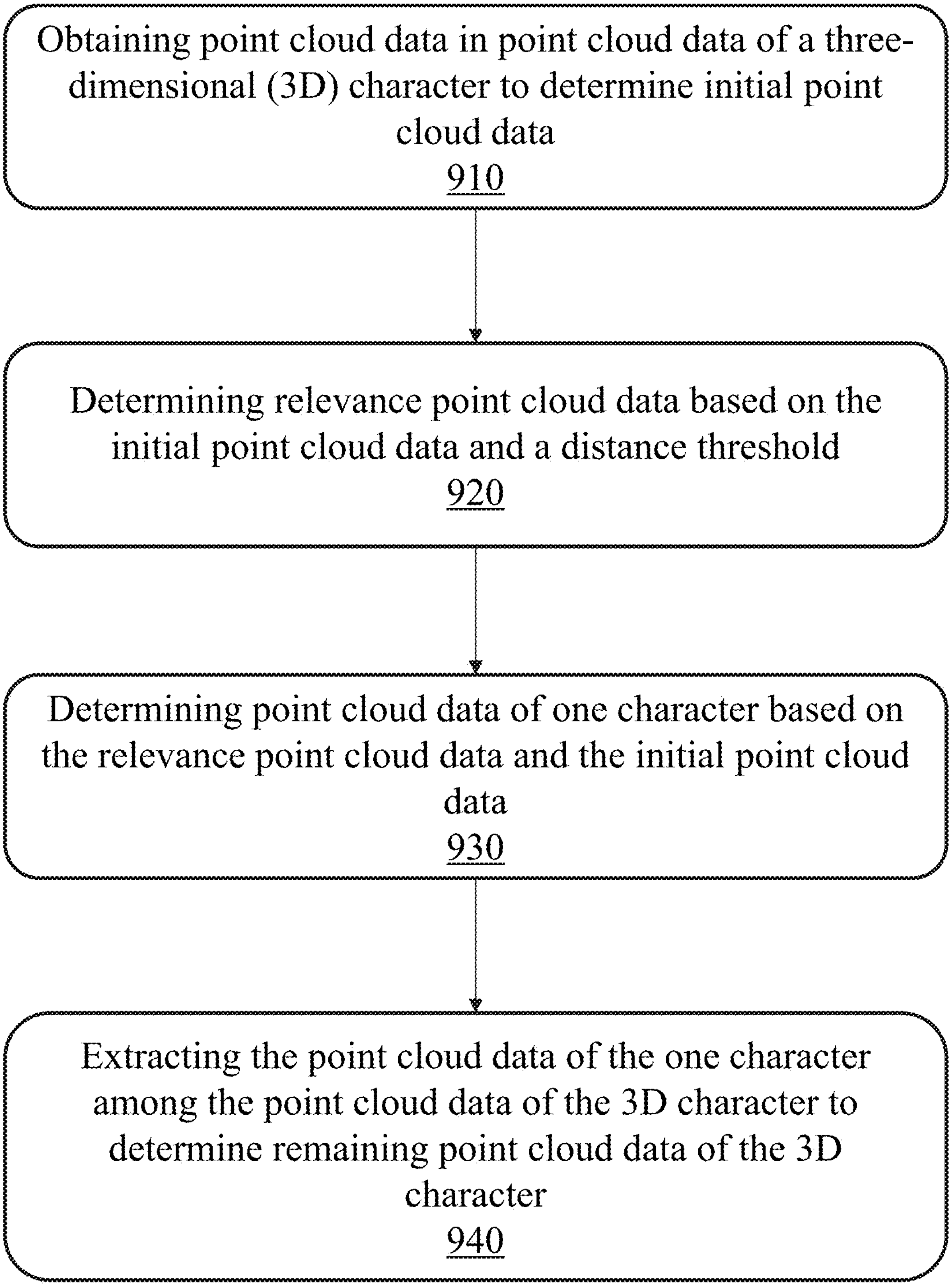
FIG. 9 is a flowchart illustrating an exemplary process for segmenting a 3D character by a clustering algorithm according to some embodiments of the present disclosure.

FIG. 9 is a flowchart illustrating an exemplary process for segmenting a 3D character by a clustering algorithm according to some embodiments of the present disclosure. In some embodiments, a 3D character may be segmented by clustering to obtain depth information of a single character. In some embodiments, the depth information of the 3D character in one or more embodiments of the present disclosure may include the point cloud data of the 3D character. The process of segmenting the 3D character by clustering is described below using the point cloud data as an example. For the details of process 900, see operations 910-940.

In 910, point cloud data in the point cloud data of the 3D character may be obtained to determine initial point cloud data. In some embodiments, operation 910 may be performed by the character segmentation unit 221.

In some embodiments, the character segmentation unit 221 may determine the initial point cloud data based on the point cloud data of the 3D character acquired by the character information acquisition device 130. For example, the character segmentation unit 221 may randomly select the point cloud data from the point cloud data of the 3D character as the initial point cloud data. As another example, the character segmentation unit 221 may take the point cloud data first acquired by the processing device when traversing the point cloud data of the 3D character as the initial point cloud data. As yet another example, the character segmentation unit 221 may take the point cloud data that is last acquired when the processing device traverses the point cloud data of the 3D character as the initial point cloud data.

In 920, the relevance point cloud data may be determined based on the initial point cloud data and a distance threshold. In some embodiments, operation 920 may be performed by the character segmentation unit 221.

In some embodiments, the character segmentation unit 221 may determine point cloud data of the single character corresponding to the initial point cloud data based on the initial point cloud data and the distance threshold. For example, if there is a plurality of initial point cloud data, and a distance between the plurality of point cloud data is greater than the distance threshold, the character segmentation unit 221 may select one of the plurality of initial point cloud data and then acquire the point cloud data of the single character corresponding to the selected initial point cloud data based on the distance threshold. As another example, if there is a plurality of initial point cloud data and the distance between the plurality of initial point cloud data is less than the distance threshold, the point cloud data of a corresponding single character may be determined based on the plurality of initial point cloud data and the distance threshold.

In some embodiments, the character segmentation unit 221 may determine, based on the initial point cloud data and the distance threshold, the relevance point cloud data of the initial point cloud data. In some embodiments, the relevance point cloud data may include a plurality of point cloud data. The relevance point cloud data and the initial point cloud data may form the point cloud data of the single character.

Figure 10:
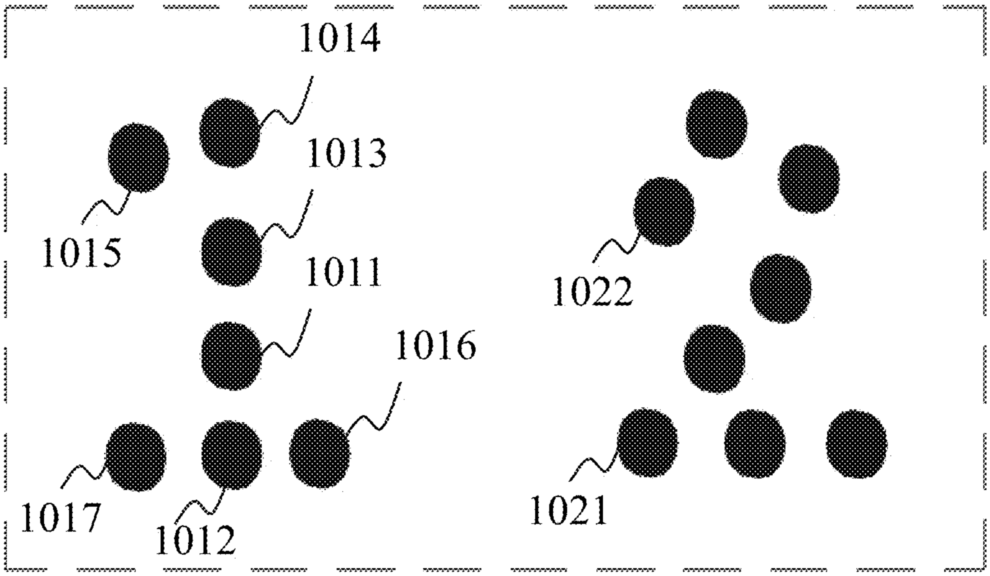
FIG. 10 is a schematic diagram illustrating determining relevance point cloud data according to some embodiments of the present disclosure.

In some embodiments, the relevance point cloud data may include first relevance point cloud data, second relevance point cloud data, . . . Nth relevance point cloud data (N being an integer greater than or equal to 1). In some embodiments, determining the relevance point cloud data of the initial point cloud data may include determining the point cloud data having a distance within the distance threshold from the initial point cloud data, as the first relevance point cloud data; determining the point cloud data having a distance within the distance threshold from the first relevance point cloud data as the second relevance point cloud data; and determining the point cloud data having a distance within the distance threshold from the nth relevance point cloud data as final relevance point cloud data. The final relevance point cloud data refers to the point cloud data from which no point cloud data is within the distance threshold except the (N−1)st relevance point cloud data. For example, in connection with FIG. 10, the 3D character includes two single characters, i.e., character “1” and character “2”. When determining the point cloud data of the single character, the character segmentation unit 221 may select the point cloud data 1011 to be as the initial point cloud data, determine point cloud data 1012 and 1013 having distances within the distance threshold (e.g., 100 micrometers) from the point cloud data 1011 as two first relevance point cloud data; determine point cloud data 1016 and 1017 having distances within the distance threshold (e.g., 100 micrometers) from the point cloud data 1012, and the point cloud data 1014 having a distance within the distance threshold (e.g., 100 micrometers) from the point cloud data 1013 as second relevance point cloud data; determine the point cloud data 1015 having a distance within the distance threshold (e.g., 100 micrometers) from the point cloud data 1014 as the third relevance point cloud data (i.e., the final relevance point cloud data). The first relevance point cloud data 1012, 1013, the second relevance point cloud data 1014, 1016, 1017, and the third relevance point cloud data 1015 may include the relevance point cloud data of the initial point cloud data 1011, and a distance between one of the point cloud data 1021, 1022, etc., belonging to another single character and one of the initial point cloud data 1011, the first relevance point cloud data 1012, 1013, the second relevance point cloud data 1014, 1016, 1017, and the third relevance point cloud data 1015 may be greater than the distance threshold, and thus is not included in the relevance point cloud data of the initial point cloud data 1011.

In some embodiments, for determining the relevance point cloud data based on the initial point cloud data and the distance threshold, the process may be performed either in a 3D space to find the relevance point cloud data based on the distance threshold or in a 2D plane to find the point cloud data. In some embodiments, the character segmentation unit 221 may project the point cloud data of the 3D character to the reference base plane, determine projection points of the point cloud data of the 3D character, and determine the point cloud data of the single 3D character based on the projection points of the point cloud data of the 3D character. More descriptions regarding the reference base plane may be found in FIG. 6 and its related descriptions.

In some embodiments, the character segmentation unit 221 may determine a projection direction, and then determine the point cloud data of the 3D character to the reference base plane along the projection direction. In some embodiments, the projection direction may be at a predetermined angle to the reference base plane. In some embodiments, the predetermined angle may be any value in a range of 45°-90°. In some embodiments, the predetermined angle may be any value in a range of 60°-90°. In some embodiments, the predetermined angle may be any value in a range of 75°-90°. Preferably, the predetermined angle is 900, i.e., the projection direction is perpendicular to the reference base plane.

Figure 11:
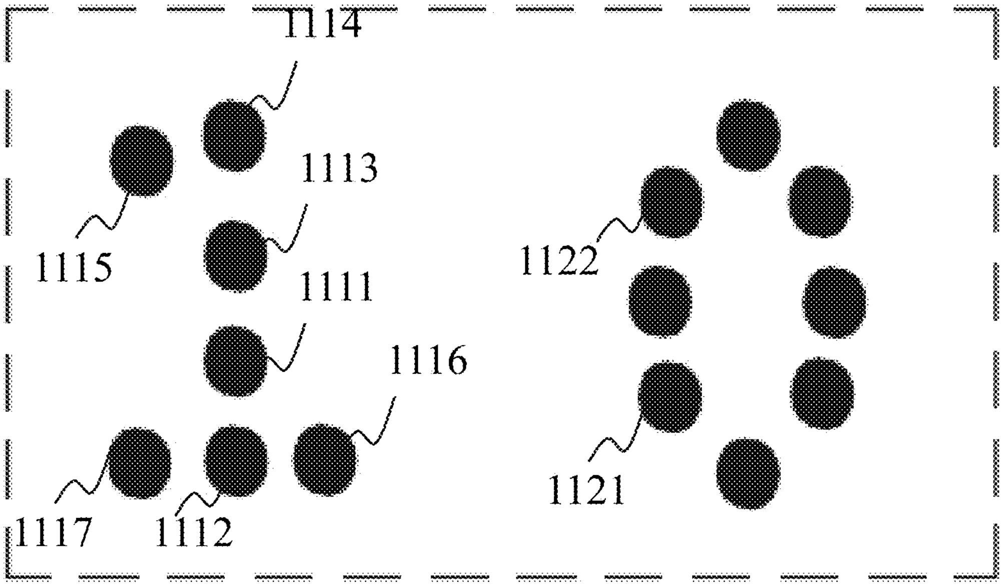
FIG. 11 is a schematic diagram illustrating determining a relevance projection point according to some embodiments of the present disclosure.

In some embodiments, the character segmentation unit 221 may determine, among the projection points, one or more relevance projection points of the projection point of the initial point cloud data, and obtain the point cloud data of the single character based on the relevance projection point. In some embodiments, the character segmentation unit 221 obtaining the relevance projection points may include: in the projection points, determining a projection point of the point cloud data having a distance within a distance threshold from the projection point of the initial point cloud data, as a first relevance projection point, determining a projection point having a distance within the distance threshold from the first relevance projection point as a second relevance projection point, and determining a projection point having a distance within the distance threshold from an Nth relevance projection point as a final relevance projection point. The final relevance projection point is a projection point from which no projection point other than the (N−1st) relevance projection point is within the distance threshold. For example, in connection with FIG. 11, the 3D character includes two single characters, i.e., character “1” and character “2”, and when segmenting the single characters, the point cloud data of the 3D character is first projected to the reference base plane, and a projection point of the point cloud data of the 3D character is determined. The projection point 1111 is a projection point of the initial point cloud data on the reference base plane. Projection points 1112 and 1113 having distances within the distance threshold (e.g., 100 micrometers) from projection point 1111 are determined as two first relevance projection points. Projection points 1116 and 1117 having distances within the distance threshold (e.g., 100 micrometers) from the projection point 1112 are determined as a second relevance projection point. A projection point 1113 having a distance within the distance threshold (e.g., 100 micrometers) from the projection point 1114 is determined as the second relevance projection point. A projection point 1115 having a distance within the distance threshold (e.g., 100 micrometers) from the projection point 1114 is determined as the third relevance projection point (i.e., the final relevance projection point). The first relevance projection points 1112 and 1113, the second relevance projection points 1114, 1116, and 1117, and the third relevance projection point 1115 comprise the relevance projection points of the projection points of the initial point cloud data 1111, and distances between the projection points 1121, 1122, etc. belonging to point cloud data of another single character and any of the projection point 1111, the first relevance projection points 1112 and 1113, the second relevance projection points 1114, 1116, and 1117, and the third relevance projection point 1115 are greater than the distance threshold, and thus are not included in the relevance projection points of the projection points 1111.

In some embodiments, the character segmentation unit 221 may determine the distance threshold based on the parameter information of the character information acquisition device 130. In some embodiments, the parameter information of the character information acquisition device 130 may include a resolution of the camera device, and the resolution may be used to reflect a resolution of two adjacent points in the point cloud data acquired by the character information acquisition device 130. In some embodiments, the character segmentation unit 221 may determine the distance threshold as a value greater than the resolution of the camera device. For example, if the camera device of the character information acquisition device 130 has a resolution of 33 micrometers, the character segmentation unit 221 may determine the distance threshold to be 50 micrometers.

In some embodiments, the character segmentation unit 221 may determine the distance threshold based on predetermined information of the 3D character. In some embodiments, the predetermined information of the 3D character may be information related to the presentation form of the 3D character. In some embodiments, the predetermined information of the 3D character may include, but is not limited to one or more of a line width of the 3D character, a character distance between two adjacent characters, a line distance between two adjacent lines of characters, or the like.

In some embodiments, the character segmentation unit 221 may determine the distance threshold based on the character distance between two adjacent characters or the line distance between two adjacent lines of characters. In some embodiments, the character segmentation unit 221 may determine the distance threshold to be a value that is less than the character distance between the two adjacent characters or the line distance between the two adjacent lines of characters. For example, if the character distance between the two adjacent characters is 1 millimeter, the character segmentation unit 221 may determine the distance threshold to be a value smaller than 1 millimeter, such as 100 micrometers.

In some embodiments, the character segmentation unit 221 may determine the distance threshold to be less than the smaller one of the character distance and the line distance. For example, if the character distance between two adjacent characters is 1 millimeter, and the line distance between two adjacent lines of characters is 0.8 millimeters, the character segmentation unit may determine the distance threshold to be a value less than 0.8 millimeters, such as 100 micrometers. In some embodiments, the character segmentation unit 221 may determine the distance threshold based on the line width of the 3D character. In some embodiments, the character segmentation unit 221 may determine the distance threshold to be less than the line width. Further, in some embodiments, the character segmentation unit 221 may set a ratio of the line width to the distance threshold to be within a range of 5-20. Furthermore, in some embodiments, the character segmentation unit 221 may set the ratio of the line width to the distance threshold to be within a range of 5-15. In some embodiments, the character segmentation unit 221 may set the ratio of the line width to the distance threshold to be within a range of 5-15.

In some embodiments, the character segmentation unit 221 may also determine the distance threshold based on the resolution of the character information acquisition device 130 and the character distance between two adjacent characters. For example, if the resolution of the character information acquisition device 130 is 33 micrometers and the character distance between two adjacent characters is 1 millimeter, the character segmentation unit 221 may determine the distance threshold to be a value greater than 33 micrometers and less than 1 millimeter (e.g., 100 micrometers).

In some embodiments, the distance threshold may be within a range of 50 micrometers-1 millimeter. In some embodiments, the distance threshold may be within a range of 50 micrometers-800 micrometers. In some embodiments, the distance threshold may be within a range of 100 micrometers-700 micrometers. In some embodiments, the distance threshold may be within a range of 200 micrometers-600 micrometers. In some embodiments, the distance threshold may be within a range of 100 micrometers-500 micrometers. In some embodiments, the distance threshold may be within a range of 500 micrometers-1 millimeter. In some embodiments, the distance threshold may be within a range of 600 micrometers-800 micrometers. In some embodiments, the process of finding the distance threshold of the relevance point cloud data in a 3D space may be the same as or different from the process of finding the distance threshold of the relevance projection points on a 2D plane. In some embodiments, the distance threshold of the relevance point cloud data found in the 3D space may be 10% smaller than the distance threshold of the relevance projection points found on the 2D plane.

In 930, point cloud data of one character may be determined based on the relevance point cloud data and the initial point cloud data. In some embodiments, operation 910 may be performed by the character segmentation unit 221.

In some embodiments, the character segmentation unit 221 may determine the initial point cloud data and the relevance point cloud data (including the first relevance point cloud data, the second relevance point cloud data, . . . , the Nth relevance point cloud data, and the final relevance point cloud data) associated therewith as the point cloud data of the character. Still taking FIG. 10 as an example, the point cloud data of the single character "1" may include initial point cloud data 1011, first relevance point cloud data 1012 and 1013, second relevance point cloud data 1014, 1016, and 1017, and third relevance point cloud data 1015.

In some embodiments, the character segmentation unit 221 may also determine the projection point of the initial point cloud data, and the relevance projection point (including the first relevance projection point, the second relevance projection point, . . . , the Nth relevance projection point, and the final relevance projection point) associated therewith as the point cloud data of the 3D character. In some embodiments, the character segmentation unit 221 may take the initial point cloud data and the point cloud data corresponding to the relevance projection point as the point cloud data of the single character.

In 940, the point cloud data of one character may be extracted among the point cloud data of the 3D character to determine remaining point cloud data of the 3D character, and point cloud data of a single character in the remaining point cloud data is determined. In some embodiments, operation 940 may be performed by the character segmentation unit 221.

In some embodiments, after determining the point cloud data of the single character, the character segmentation unit 221 may extract the point cloud data of the single character among the point cloud data of the 3D character, and designate the rest of the point cloud data as the remaining point cloud data. For example, the 3D character includes two single characters, character “1” and character “2”, the point cloud data of the 3D character includes 100 point cloud data numbered 1-100. The character segmentation unit 221 may determine that the point cloud data of the character “1” includes the point cloud data 1-40, and the character segmentation unit 221 may extract the point cloud data 1-40 from the point cloud data of the 3D character and designate remaining point cloud data 41-100 as the remaining point cloud data.

In some embodiments, for determining the point cloud data of the single character in the remaining point cloud data, the character segmentation unit 221 may refer to operations 910-930, i.e., obtaining at least one initial point cloud data from the remaining point cloud data; determining the initial point cloud data in the remaining point cloud data based on the remaining initial point cloud data in the point cloud data and the distance threshold; and determining the point cloud data of the single character in the remaining point cloud data based on the relevance point cloud data in the remaining point cloud data and the initial point cloud data. In some embodiments, after the extraction of the point cloud data of the single character, the character segmentation unit 221 may determine whether the point cloud data of the single character in the 3D character is determined. If the point cloud data of the single character is not determined, then it is necessary to continue determining the remaining point cloud data of the 3D character and determining the point cloud data of the single character in the remaining point cloud data. If the point cloud data of the single character is determined, then it is not necessary to continue determining the point cloud data of the single character in the remaining point cloud data.

In some embodiments, the character segmentation unit 221 may determine whether the point cloud data of the single character in the 3D character is determined based on whether the remaining point cloud data is less than a predetermined threshold. For example, a 3D character consists of two single characters, i.e., characters “1” and “2”, and the point cloud data of the 3D character includes 100 pieces of point cloud data numbered 1-60. After the character segmentation unit 221 determines that the character “1” includes point cloud data 1-30, the point cloud data 1-30 may be extracted from the point cloud data of the 3D character, and remaining point cloud data 31-60 may be designated as the remaining point cloud data, then the character segmentation unit 221 may determine that the quantity of the remaining point cloud data (i.e., 30) is greater than the predetermined threshold (e.g., 10). Thus, the character segmentation unit 221 may determine that the point cloud data of the single character in the 3D character that is not determined, then it is necessary to obtain at least one initial point cloud data from the remaining point cloud data and determine the relevance point cloud data in the remaining point cloud data based on the initial point cloud data in the remaining point cloud data and the distance threshold. It is determined that the point cloud data of the character “2” in the remaining point cloud data is the point cloud data 31-55 based on the relevance point cloud data in the remaining point cloud data and the initial point cloud data. The character segmentation unit 221 may extract the point cloud data 31-55 of the character “2” from the point cloud data 31-60 and designate the remaining point cloud data 56-60 as the remaining point cloud data. If the character segmentation unit 221 determines that the quantity of the remaining point cloud data (i.e., 5) is less than the predetermined threshold (e.g., 10), the character segmentation unit 221 may determine that the point cloud data of the single character in the 3D character is determined. Thus, there is no need to continue to obtain initial point cloud data from the remaining point cloud data (i.e., the remaining point cloud data 56-60) to determine the point cloud data of one character in the remaining point cloud data, and the 3D character recognition module 220 may perform subsequent character recognition based on the point cloud data of the segmented single character.

In some embodiments, after the extraction of the point cloud data of the single character, the character segmentation unit 221 may determine, based on whether the count of extracted single characters satisfies a predetermined condition, whether the point cloud data of the single character in the 3D character is determined. Furthermore, the character segmentation unit 221 may determine, based on whether the count of extracted single characters is equal to a predetermined count, whether the point cloud data of the single character in the 3D character is determined. In some embodiments, for a 3D character including a plurality of lines of characters, the character segmentation unit 221 may also determine a line character of the 3D character. In some embodiments, the character segmentation unit 221 may obtain line and column information of the 3D character, and after determining the point cloud data of the 3D character for all the single characters in the point cloud data of the 3D character, determine the line character of the 3D character based on the line and column information. The line and column information may be information used to characterize an arrangement of the characters in the 3D character. In some embodiments, the line and column information may include one or more of a line alignment direction, a column alignment direction, a count of single characters per line, a count of single characters per column, or the like. In some embodiments, the character segmentation unit 221 may designate any straight line that is parallel or approximately parallel to the height direction of the 3D character as the column alignment direction. Approximately parallel means that an angle between the column alignment direction and the height direction of the 3D character is at an angle within a range of 170°-180°. In some embodiments, the character segmentation unit 221 may designate one of the straight lines that is parallel or approximately parallel to the length direction of the 3D character as the line alignment direction. Approximately parallel means an angle between the line alignment direction and the length direction of the 3D character is within a range of 170°-180°.

In some embodiments, the storage device 150 may have pre-stored line and column information, and the character segmentation unit 221 may obtain the line and column information from the storage device 150 via the network 120. In other embodiments, the character segmentation unit 221 may also obtain the line and column information from the terminal device 140 via the network 120.

In some embodiments, the character segmentation unit 221 may determine the line character of the 3D character based on the line alignment direction or the column alignment direction. Furthermore, the character segmentation unit 221 may determine the line character of the 3D character based on the point cloud data of the single character and the line alignment direction or the column alignment direction. In some embodiments, the character segmentation unit 221 may calculate a center of gravity of the single character based on the point cloud data of the single character and determine the line character of the 3D character based on the center of gravity of the single character and the line alignment direction or column alignment direction. The center of gravity of the single character may be used to characterize a coordinate mean of the point cloud data of the single character. In some embodiments, the character segmentation unit 221 may calculate the center of gravity of the single character based on coordinates of the point cloud data of the single character. Furthermore, the character segmentation unit 221 may calculate the center of gravity of the single character based on the mean of the point cloud data of the single character on each coordinate axis. For example, a single character includes three pieces of point cloud data, and the coordinates corresponding to the three pieces of point cloud data are (1, 1, 1), (1, 2, 1), (1, 3, 1), respectively. Then the character segmentation unit 221 may determine a center of gravity of the single character in an X-axis has a value of (1+1+1)/3=1, a center of gravity of the single character in a Y-axis has a value of (1+2+3)/3=2, a center of gravity of the single character in a Z-axis has a value of (1+1+1)/3=1, and the coordinate of the center of gravity of the single character in the Z-axis is (1, 2, 1). In some embodiments, the character segmentation unit 221 may determine whether a line connecting the centers of gravity of two single characters is parallel or approximately parallel to the line alignment direction to determine the line character. Approximately parallel means that an angle between the line connecting the centers of gravity of two single characters and the line alignment direction is within a range of 170°-180°. For example, if the angle between the line connecting the centers of gravity of the two single characters and the line alignment direction is 175°, the two single characters may be determined to belong to the same line. In some embodiments, the character segmentation unit 221 may determine whether the line connecting the centers of gravity of two single characters is parallel or approximately perpendicular to the column alignment direction to determine the line character. Approximately perpendicular means that an angle between the line connecting the centers of gravity of two single characters and the column arrangement direction is within a range of 80°-100°. For example, if the angle between the line connecting the centers of gravity of the two single characters and the column alignment direction is 85°, the two single characters may be determined to belong to the same line.

In some embodiments, after determining the point cloud data of at least one single character in the 3D character in operation 930 or operation 940, added point cloud data related to the character may be generated based on the initial point cloud data and the relevance point cloud data. Therefore, more projection points may be generated in the subsequent projection process to the 2D plane, which facilitates subsequent character recognition. For example, a plurality of added point cloud data may be generated between the initial point cloud data and the first relevance point cloud data, and the plurality of added point cloud data may be generated between the first relevance point cloud data and the second relevance point cloud data. The plurality of added point cloud data may be generated between the Nth relevance point cloud data and the final relevance point cloud data. More descriptions regarding generating the added point cloud data may be found elsewhere in the present disclosure.

In some embodiments, the system 200 may determine the resolution of the character information acquisition device that acquires the point cloud data of the 3D character based on known information about the 3D character and determine a search radius based on the resolution. The search radius may be a distance threshold for determining whether two pieces of point cloud data are relevance point cloud data. Thus, the system 200 may segment the 3D character more accurately. More descriptions regarding determining the search radius based on the known information of the 3D character may be found in FIG. 12 and FIG. 13.

Figure 12:
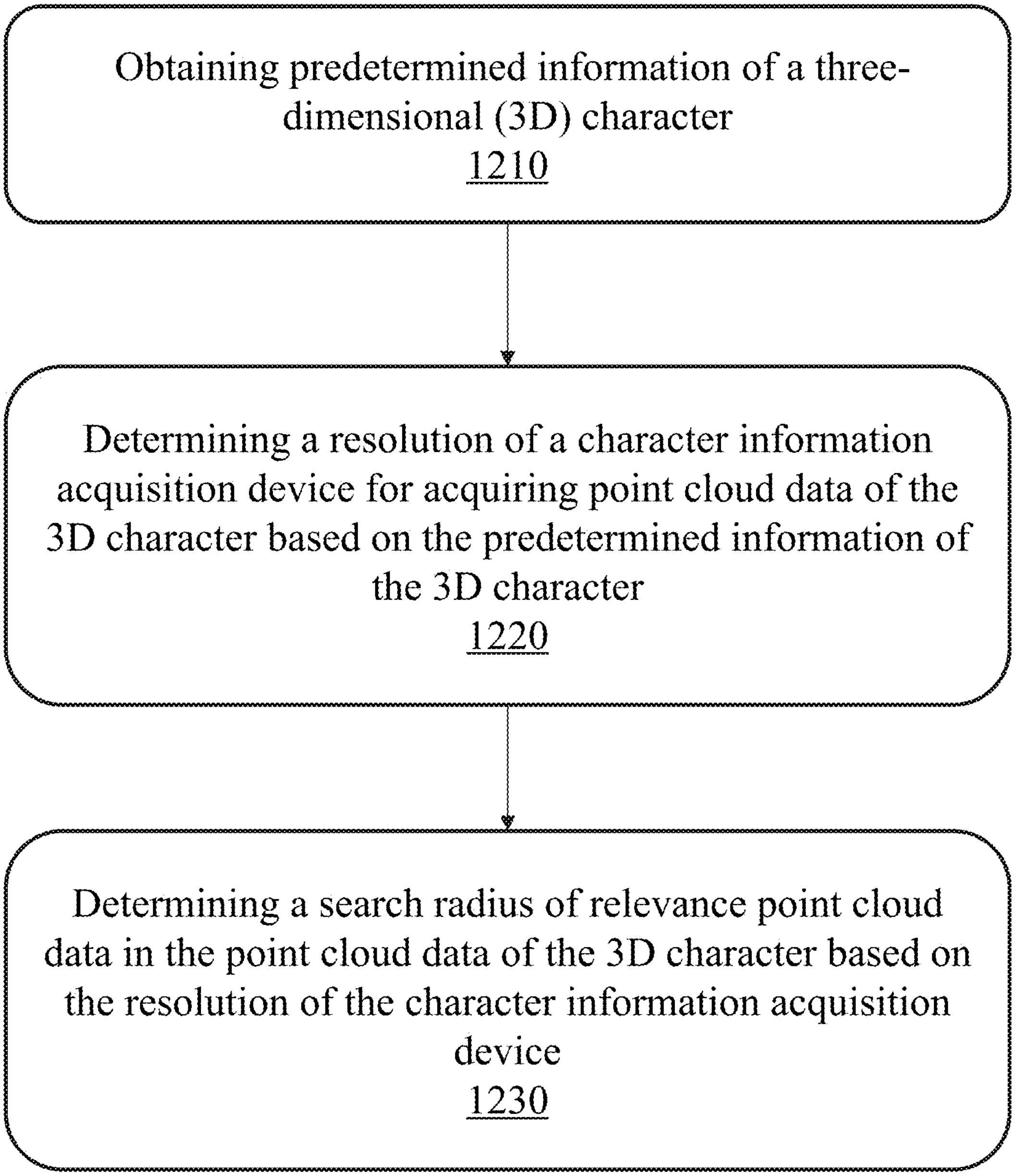
FIG. 12 is a flowchart illustrating an exemplary process for determining a resolution of a character information acquisition device based on predetermined information of a 3D character according to some embodiments of the present disclosure.

FIG. 12 is a flowchart illustrating an exemplary process for determining a resolution of a character information acquisition device based on predetermined information of a 3D character according to some embodiments of the present disclosure. For more details of process 1200 refer to operations 1210-1230.

In 1210, predetermined information of the 3D character may be obtained.

In some embodiments, the predetermined information may be information related to a representation form of the 3D character. In some embodiments, the predetermined information may include at least one of a line width of the 3D character, a character distance between two adjacent characters, and a line distance between two adjacent lines of characters.

In some embodiments, the processing device 110 may obtain the predetermined information of the 3D character from input information of a terminal device. In some embodiments, the input information of the terminal device 140 may include specific numerical information of the predetermined information of the 3D character. For example, the line width of the 3D character is 3 millimeters. As another example, the character distance between two adjacent characters is 5 millimeters. In some embodiments, the input information of the terminal device 140 may also include QR code information corresponding to the specific numerical information. For example, the terminal device 140 may determine the predetermined information of the 3D character by recognizing the QR code information for a workpiece corresponding to the 3D character.

In some embodiments, an operator may make measure the 3D character to determine the predetermined information of the 3D character, which is input to the terminal device 140. Then the terminal device 140 may send the predetermined information to the processing device 110. In some embodiments, an exemplary data measurement device may include a spiral micrometer, a vernier caliper, an image measuring instrument, or the like.

In some embodiments, the data measurement device may automatically measure the predetermined information of the 3D character, and automatically send the predetermined information to the terminal device 140 and/or the processing device 110.

In 1220, a resolution of a character information acquisition device for acquiring point cloud data of the 3D character may be determined based on the predetermined information of the 3D character.

In some embodiments, the resolution of the character information acquisition device for acquiring the point cloud data of the 3D character may be determined based on predetermined information of the 3D character. Further, the resolution of the character information acquisition device for acquiring the point cloud data of the 3D character may be determined based on at least one of a line width of the 3D character, a character distance between two adjacent characters, or a line distance between two adjacent lines of characters. In some embodiments, the resolution of the character information acquisition device may be determined based on a minimum value of the line width, the character distance, and the line distance.

In some embodiments, a ratio of one of the line width, the character distance, or the line distance to the resolution of the character information acquisition device 130 may be within a range of 5-10. In some embodiments, a ratio of the minimum value of the line width, the character distance, and the line distance to the resolution of the character information acquisition device 130 may be within a range of 5-10.

In 1230, a search radius of relevance point cloud data in the point cloud data of the 3D character may be determined based on the resolution of the character information acquisition device.

In some embodiments, the search radius of the relevance point cloud data may be a distance threshold for determining whether the point cloud data is the relevance point cloud data. For example, if the search radius is 1 millimeter and a distance between initial point cloud data A and point cloud data B is 1.5 millimeters, i.e., the distance between the initial point cloud data A and the point cloud data B is greater than the search radius, and the point cloud data B is not the relevance point cloud data of the initial point cloud data A. As another example, if the search radius is 1 millimeter, and the distance between the initial point cloud data A and the point cloud data B is 0.5 millimeters, i.e., the distance between the initial point cloud data A and the point cloud data B is less than the search radius, and the point cloud data B is the relevance point cloud data of the initial point cloud data A. More descriptions regarding the relevance point cloud data and the distance threshold may be found in FIG. 9 and its related descriptions.

In some embodiments, the search radius (i.e., the distance threshold) of the relevance point cloud data in the point cloud data of the 3D character may be determined based on the resolution of the character information acquisition device. In some embodiments, the value of the search radius is greater than the resolution. In some embodiments, a ratio of the search radius to the resolution is within a range of 5-10.

In some embodiments, the search radius of the relevance point cloud data may also be directly determined based on the predetermined information of the 3D character. In some embodiments, a ratio of one of the line width, the character distance, or the line distance of the 3D character to the search radius is within a range of 5-20. In some embodiments, a ratio of the minimum value of the line width, the character distance, and the line distance of the 3D character to the search radius is within a range of 5-20.

In some embodiments, there may be differences in representation forms of at least one 3D character processed on different workpieces, i.e., predetermined information of the 3D character processed on different workpieces may be different and the system 100 may automatically obtain predetermined information (e.g., the line width of the character or the character distance) of a 3D character to be recognized, and automatically adjust, based on the acquired predetermined information, the resolution of the character information acquisition device 130 for acquiring the point cloud data of the 3D character. Thus, the resolution of the character information acquisition device may match the predetermined information of the 3D character to be recognized, thereby improving the recognition accuracy of the character information acquisition device. In some embodiments, the system 100 may also determine, based on the adjusted resolution, the search radius of the relevance point cloud data in the point cloud data of the 3D character, thereby realizing more accurate clustering of the point cloud data of the single character and improving the accuracy of character segmentation or character recognition. In some embodiments, the system 100 may also automatically adjust the search radius of the relevance point cloud data using a program algorithm based on the acquired predetermined information, so that the search radius of the relevance point cloud data may match the predetermined information of the 3D character, thereby improving the accuracy of searching for the relevance point cloud data and improving the accuracy of character segmentation or character recognition.

In some embodiments, the system 100 may also adjust the search radius of the relevance point cloud data directly based on the resolution of the character information acquisition device 130. The resolution of the character information acquisition device 130 may be a default setting or may be determined based on the predetermined information of the 3D character. Further description may be found in FIG. 13.

Figure 13:
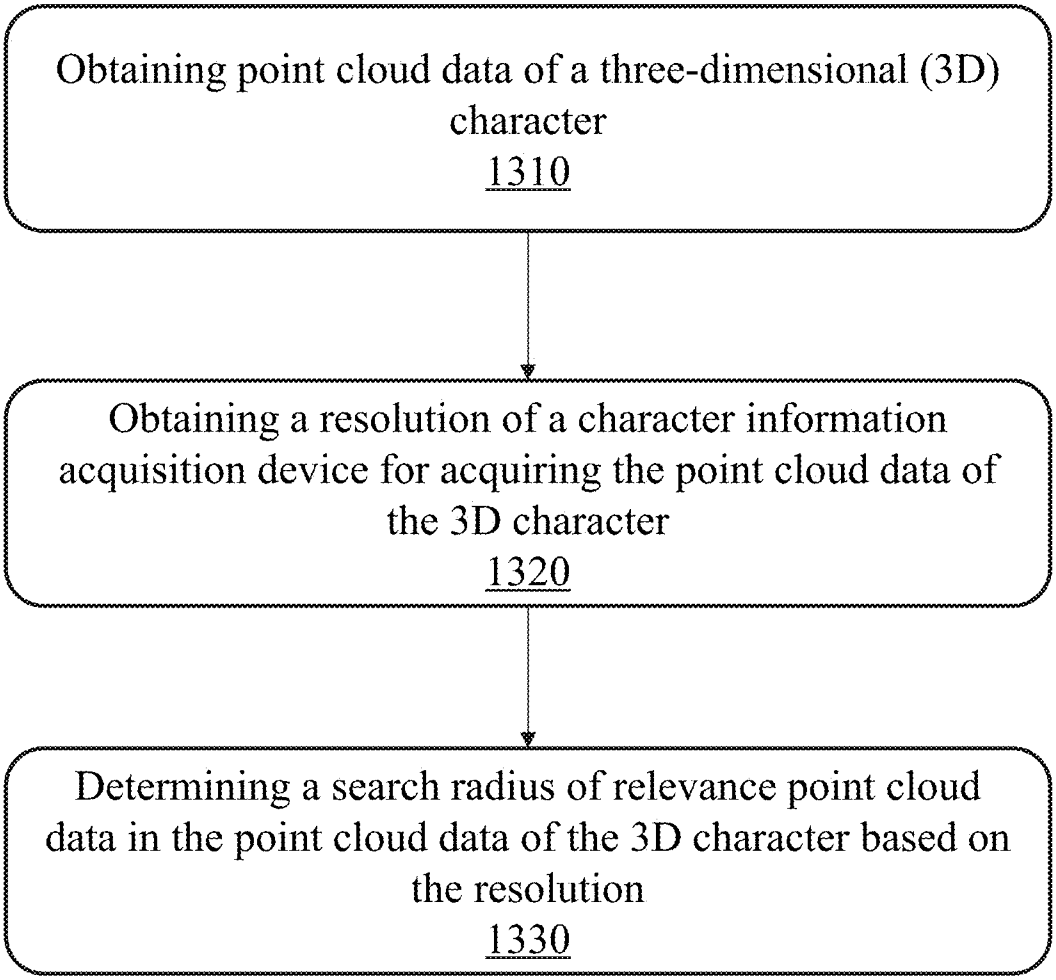
FIG. 13 is a flowchart illustrating an exemplary process for determining a search radius based on a resolution of an information acquisition device according to some embodiments of the present disclosure.

FIG. 13 is a flowchart illustrating an exemplary process for determining a search radius based on a resolution of an information acquisition device according to some embodiments of the present disclosure. For details of process 1300, please refer to operations 1310-1330.

In 1310, the resolution of the character information acquisition device for acquiring point cloud data of a 3D character may be obtained.

In some embodiments, the processing device 110 may obtain the resolution of the character information acquisition device based on predetermined information of the 3D character. The resolution is used to reflect a distance between two adjacent points in the point cloud data acquired by the character information acquisition device. Further, the processing device 110 may obtain the resolution of the character information acquisition device 130 based on the line width or the character distance. For example, by setting a ratio of the character distance to the resolution of the character information acquisition device 130 to 10, and obtaining a character distance of 1 millimeter, the resolution of the character information acquisition device 130 may be set to 100 micrometers. More detailed descriptions regarding obtaining the resolution of the character information acquisition device based on the predetermined information of the 3D character may be found in FIG. 12 and its related descriptions.

In other embodiments, the processing device 110 may also obtain the resolution of the character information acquisition device 130 directly from other devices. For example, the processing device 110 may obtain the resolution of the character information acquisition device based on input information of the terminal device 140. As another example, the processing device 110 may pre-store the resolution of the character information acquisition device 130, and the storage device 150 may obtain the resolution of the character information acquisition device. As yet another example, the processing device 110 may obtain the resolution of the character information acquisition device 130 directly from the character information acquisition device 130.

In 1320, a search radius of relevance point cloud data in the point cloud data of the 3D character may be determined based on the resolution.

In some embodiments, the processing device 110 may determine the search radius of the relevance point cloud data in the point cloud data of the 3D character based on the resolution of the character information acquisition device 130. In some embodiments, the search radius may be greater than the resolution. In some embodiments, a ratio of the search radius to the resolution may be within a range of 5-10.

In some embodiments, a color of a light source may be automatically determined and/or adjusted based on information of a workpiece. In some embodiments, the system 100 may obtain the information of the workpiece where the 3D character is located and determine the color of the light source based on the information of the workpiece where at least one 3D character is located. In some embodiments, the information of the workpiece includes the color of the surface of the workpiece where the 3D character is located.

In some embodiments, the system 100 may determine a color of the 3D character and a color of the surface of the workpiece where the 3D character is located based on an embossed character acquired by a flat camera and an image of the surface of the workpiece where the 3D character is located. If the color of the surface of the workpiece where the 3D character is located is determined, a color that is inconsistent with the color of the 3D character and the surface of the workpiece where the 3D character is located is selected to be the color of the light source.

In some embodiments, after determining the color of the light source, the identification system 100 may output a color of a recommended light source. The operator may decide whether to select the color of the recommended light source based on a color suggestion output by the system. In some embodiments, the system 100 may adjust the color of the light source in the character information acquisition device 130 based on the determined color of the light source.

In some embodiments, a processing device for determining the color of the light source based on the information of the workpiece where the 3D character is located may be a part of the character information acquisition device 130 or a part of the processing device 110 in one or more embodiments of the present disclosure.

One or more embodiments in the present disclosure may include but are not limited to the following beneficial effects. First, in one or more embodiments, the depth information of the 3D character is converted into the 2D image, and then the 2D image is recognized. The recognition of 3D character is ultimately converted into the recognition of the 2D image using the character recognition algorithm, which improves the recognition accuracy. Second, in one or more embodiments of the present disclosure, the depth information of the 3D character is recognized directly based on the predetermined algorithm (e.g., the machine learning model) to determine the recognition result (e.g., the character meaning) of the 3D character, which improves the recognition accuracy and the recognition efficiency. Third, in one or more embodiments of the present disclosure, the depth information (e.g., the point cloud data) of the 3D character is segmented into the depth information (e.g., the point cloud data) of the single character. The segmented depth information of the single character (e.g., the point cloud data) may be designated as the training samples for machine learning models. The trained machine learning module may recognize the depth information of the 3D character to determine the recognition result (e.g., the character meaning of the 3D character).

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and amendments are intended to be suggested by this disclosure and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

In addition, those skilled in the art may understand that various aspects of the present disclosure may be explained and described through several patentable types or situations, including any new and useful combination of processes, machines, products, or substances, or any new and useful improvements to them. Accordingly, aspects of the present disclosure may be performed entirely by hardware, may be performed entirely by software (including firmware, resident software, microcode, etc.), or may be performed by a combination of hardware and software. The above hardware or softwares can be referred to as "data block", "module", "engine", "unit", "component" or "system". Additionally, aspects of the present disclosure may be manifested as a computer product disposed in one or more computer-readable media, and the product includes computer-readable program code.

The computer storage medium may contain a propagated data signal with a computer program encoded within it, e.g., on a baseband or as part of a carrier. The propagated data signal may have a plurality of representation forms, including an electromagnetic form, an optical form, or the like, or suitable combinations thereof. The computer storage medium may be any computer-readable medium, other than a computer-readable storage medium, which may be used by connecting to an instruction-executing system, device, or apparatus for communicating, propagating, or transmitting. The program code disposed on the computer storage medium may be disseminated via any suitable medium, including radio, cable, fiber optic cable, RF, or the like, or a combination thereof.

The program code required for the operation of each part of the present disclosure may be written in any one or more programming languages, including object-oriented programming languages such as Java, Scala, Smalltalk, Eiffel, JADE, Emerald, C++, C#, VB.NET, Python, etc., conventional procedural programming languages such as C, Visual Basic, Fortran 2003, Perl, COBOL 2002, PHP, ABAP, dynamic programming languages such as Python, Ruby and Groovy, or other programming languages. The program code may be run entirely on a user's computer, as a stand-alone package on the user's computer, partially on the user's computer and partially on a remote computer, or entirely on a remote computer or server. In the latter case, the remote computer may be connected to the user's computer through any form of network, such as a local area network (LAN) or a wide area network (WAN), or connected to an external computer (e.g., via the Internet), or in a cloud computing environment, or used as a service such as software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

What is claimed is:

1. A method for recognizing a three-dimensional (3D) character, comprising:

obtaining depth information of the 3D character, wherein the depth information includes point cloud data of the 3D character; and recognizing the 3D character based on the point cloud data of the 3D character in the depth information, wherein:

the 3D character includes more than two characters, and the recognizing the 3D character based on the point cloud data of the 3D character in the depth information includes:

segmenting the 3D character based on the point cloud data of the 3D character to obtain point cloud data of a segmented 3D character, including:

determining a reference baseline based on midlines of the 3D character in a height direction and a thickness direction;

obtaining a projection result by projecting the point cloud data of the 3D character to the reference baseline in a direction perpendicular to the reference baseline; and determining a segmentation boundary based on the projection result; and determining a character outline based on the point cloud data of the segmented 3D character.

2. The method of claim 1, wherein the reference baseline includes a single character reference baseline for segmenting the 3D character into a single character or a single line reference baseline for segmenting the 3D character into a plurality of single line characters;

determining the single character reference baseline based on midlines of the 3D character in a height direction and a thickness direction includes:

in response to determining that the single line reference baseline is parallel to the height direction of the 3D character, determining the single line reference baseline.

3. The method of claim 1, the determining a segmentation boundary based on the projection result includes:

determining a region where a count of projection points is lower than a predetermined threshold as a segmentation region based on distribution of the projection points on the reference baseline, or determining a region where a change value in the count of projection points is greater than a predetermined difference as the segmentation region; and determining the segmentation boundary based on the segmentation region.

4. The method of claim 1, wherein the determining a character outline based on the point cloud data of the segmented 3D character includes:

determining a reference base plane based on the point cloud data of the segmented 3D character;

obtaining a projection result by projecting the point cloud data of the segmented 3D character to the reference base plane; and determining the character outline of the segmented 3D character based on the projection result generated by projecting the point cloud data of the segmented 3D character to the reference base plane.

5. The method of claim 4, wherein the determining a reference base plane based on the segmented 3D character includes:

determining the reference base plane based on a predetermined algorithm and the point cloud data of the segmented 3D character, wherein:

the predetermined algorithm includes a least square algorithm or a Chebyshev algorithm.

6. The method of claim 1, wherein the recognizing the 3D character based on the point cloud data of the 3D character in the depth information further includes:

determining a corresponding 2D image based on a recognition result of the character outline of the 3D character, wherein the 2D image is a binarized image; and the determining a corresponding 2D image based on a recognition result of the character outline of the 3D character includes:

marking a point corresponding to the character outline of the 3D character as 0: marking a point corresponding to a background other than the 3D character as 1: or marking the point corresponding to the character outline of the 3D character as 1: marking the point corresponding to the background other than the 3D character as 0.

7. The method of claim 1, wherein the recognizing the 3D character based on the point cloud data of the 3D character in the depth information includes:

generating at least one added point cloud data by processing the point cloud data of the 3D character; and determining a character outline of the 3D character based on the at least one added point cloud data and the point cloud data of the 3D character.

8. The method of claim 7, wherein the determining a character outline of the 3D character based on the at least one added point cloud data and the point cloud data of the 3D character includes:

determining projection data based on the at least one added point cloud data and the point cloud data of the 3D character; and determining the character outline of the 3D character based on the projection data.

9. The method of claim 7, wherein the generating at least one added point cloud data by processing the point cloud data of the 3D character includes:

obtaining position information of two point cloud data in point cloud data of single characters after segmentation; and generating added point cloud data between the two point cloud data based on the position information of the two point cloud data.

10. The method of claim 9, wherein the generating at least one added point cloud data between two point cloud data includes: generating the added point cloud data between two point cloud data based on an interpolation algorithm.

11. The method of claim 7, wherein the generating at least one added point cloud data by processing the point cloud data of the 3D character includes:

obtaining position information of two adjacent point cloud data in the point cloud data of the 3D character; and generating the added point cloud data between the two adjacent point cloud data based on the position information of the two adjacent point cloud data.

12. The method of claim 11, wherein the obtaining position information of two adjacent point cloud data in the point cloud data of the 3D character includes:

obtaining position information of at least one of the point cloud data of the 3D character to be as position information of initial point cloud data; and determining position information of adjacent point cloud data near the initial point cloud data based on the position information of the initial point cloud data and a distance threshold.

13. The method of claim 12, wherein the point cloud data of the 3D character is acquired by a character information acquisition device, the distance threshold is greater than a resolution of the character information acquisition device; and the resolution is used to reflect a distance between two adjacent points in the point cloud data acquired by the character information acquisition device.

14. The method of claim 1, wherein the obtaining depth information of the 3D character includes obtaining the point cloud data of the 3D character, including:

obtaining overall point cloud data of the 3D character and a surface of a workpiece where the 3D character is located;

obtaining 3D model information of the surface of the workpiece where the 3D character is located; and determining the point cloud data of the 3D character based on the overall point cloud data and the 3D model information.

15. The method of claim 14, wherein the determining the point cloud data of the 3D character based on the overall point cloud data and the 3D model information includes:

determining point cloud data of the surface of the workpiece in the overall point cloud data based on the overall point cloud data and the 3D model information; and determining the point cloud data of the 3D character based on the point cloud data of the surface of the workpiece.

16. The method of claim 15, wherein the determining point cloud data of the surface of the workpiece in the overall point cloud data based on the overall point cloud data and the 3D model information includes:

determining base plane point cloud data in the overall point cloud data that matches the 3D model information of the surface of the workpiece based on a predetermined algorithm; and determining point cloud data having a distance from the base plane point cloud data exceeding a predetermined threshold, as the point cloud data of the 3D character.

17. The method of claim 1, the determining a character outline based on the point cloud data of the segmented 3D character includes:

establishing a 3D Cartesian coordinate system by designating a position of a character information acquisition device as a coordinate center, and calibrating Cartesian coordinates of each point in the point cloud data of the segmented 3D character;

establishing a 3D cylindrical coordinate system by designating the position of the character information acquisition device as a coordinate center, establishing a conversion relationship between the Cartesian coordinates and cylindrical coordinates of each point in 3D point cloud data to transform 3D point cloud data from the Cartesian coordinate system to the cylindrical coordinate system;

establishing a 2D cylindrical plane coordinate system by unfolding a cylindrical plane of the 3D cylindrical coordinate system, establishing a conversion relationship between 3D cylindrical coordinates and cylindrical coordinates of the 2D cylindrical plane coordinate system of each point in the point cloud data of the segmented 3D character; and transforming point cloud data from the 3D cylindrical coordinate system to the 2D cylindrical plane coordinate system, generating 2D pixel coordinates of the segmented 3D character, and determining the character outline according to 2D pixel coordinates of each point of a single character.

18. A system, comprising:

at least one storage device including a set of instructions; and at least one processor configured to communicate with the at least one storage device, wherein when executing the set of instructions, the at least one processor is configured to direct the system to perform operations including:

obtaining depth information of the 3D character, wherein the depth information includes point cloud data of the 3D character; and recognizing the 3D character based on the point cloud data of the 3D character in the depth information, wherein:

the 3D character includes more than two characters, and the recognizing the 3D character based on the point cloud data of the 3D character in the depth information includes:

segmenting the 3D character based on the point cloud data of the 3D character to obtain point cloud data of a segmented 3D character, including:

determining a reference baseline based on midlines of the 3D character in a height direction and a thickness direction;

obtaining a projection result by projecting the point cloud data of the 3D character to the reference baseline in a direction perpendicular to the reference baseline; and determining a segmentation boundary based on the projection result; and determining a character outline based on the point cloud data of the segmented 3D character.

* * * * *